US007357401B2

(12) United States Patent
LeBlanc, Sr. et al.

(10) Patent No.: US 7,357,401 B2
(45) Date of Patent: *Apr. 15, 2008

(54) STEERING SYSTEM FOR AUTOMOTIVE VEHICLES

(75) Inventors: James C. LeBlanc, Sr., Rochester, MI (US); James C. LeBlanc, Jr., Washington, MI (US); Paul D. Bentley, Rochester, MI (US)

(73) Assignee: General Purpose Vehicles, Inc., New Haven, MI (US)

( * ) Notice: Subject to any disclaimer, the term of this patent is extended or adjusted under 35 U.S.C. 154(b) by 325 days.

This patent is subject to a terminal disclaimer.

(21) Appl. No.: 10/969,911

(22) Filed: Oct. 22, 2004

(65) Prior Publication Data

US 2005/0110262 A1  May 26, 2005

Related U.S. Application Data

(63) Continuation-in-part of application No. PCT/US03/31305, filed on Oct. 3, 2003.

(51) Int. Cl.
  B62D 1/00   (2006.01)
  B62D 7/04   (2006.01)
(52) U.S. Cl. ...................................... 280/91.1; 180/409
(58) Field of Classification Search ................ 280/771, 280/93.51, 91.1, 93.502, 91.512, 93.513, 280/93.512; 180/408, 409
See application file for complete search history.

(56) References Cited

U.S. PATENT DOCUMENTS 3,689,107 A * 9/1972 Humes ....................... 280/426
5,033,763 A * 7/1991 Daenens et al. ............. 280/426
5,076,597 A * 12/1991 Korekane et al. ........... 180/409
5,143,400 A * 9/1992 Miller et al. .............. 280/5.522
5,495,905 A * 3/1996 Fini, Jr. ...................... 180/21
6,203,038 B1 * 3/2001 Bernhard ............... 280/93.502
6,283,483 B1 * 9/2001 Johnson et al. ......... 280/86.758
6,675,925 B2 * 1/2004 Takahashi et al. .......... 180/266
6,824,488 B2 * 11/2004 Timoney et al. ............ 475/221
6,883,815 B2 * 4/2005 Archer ...................... 280/91.1
7,195,272 B2 * 3/2007 Larson et al. ............... 280/680
2003/0155735 A1 * 8/2003 Takahashi et al. ........ 280/93.51
2004/0245739 A1 * 12/2004 Larson et al. ......... 280/124.163
2006/0208443 A1 * 9/2006 LeBlanc et al. ....... 280/93.502

* cited by examiner

Primary Examiner—Paul N. Dickson
Assistant Examiner—Joseph Rocca
(74) Attorney, Agent, or Firm—Peter N. Lalos

(57) ABSTRACT

A steering system for a vehicle having a body supported on at least two sets of steerable wheels, generally consisting of a steering shaft provided with a wheel, supported on such body; a torque transmitting main shaft supported longitudinally on the body; means operatively interconnecting the steering shaft and the main shaft for transmitting rotary motion of the steering shaft to rotary motion of the main shaft; a first transversely displaceable means operatively interconnecting knuckle brackets of one of the sets of steerable wheels; a steering gear directly operatively interconnecting the main shaft and the first transversely displaceable means for translating rotary motion of the main shaft to linear motion of the first transversely displaceable means; second transversely displaceable means operatively interconnecting knuckle brackets of the other of the sets of steerable wheels; and a steering gear directly operatively interconnecting the main shaft and the second transversely displaceable means for translating rotary motion of the main shaft to linear motion of the second transversely displaceable means.

19 Claims, 16 Drawing Sheets

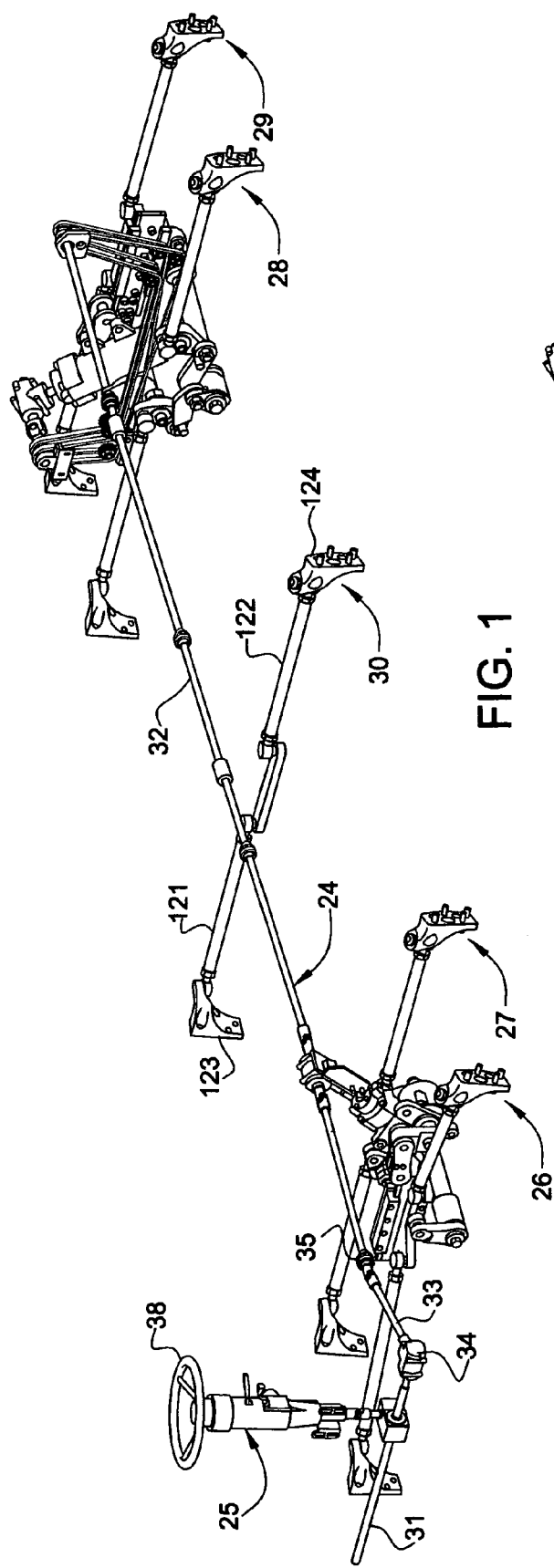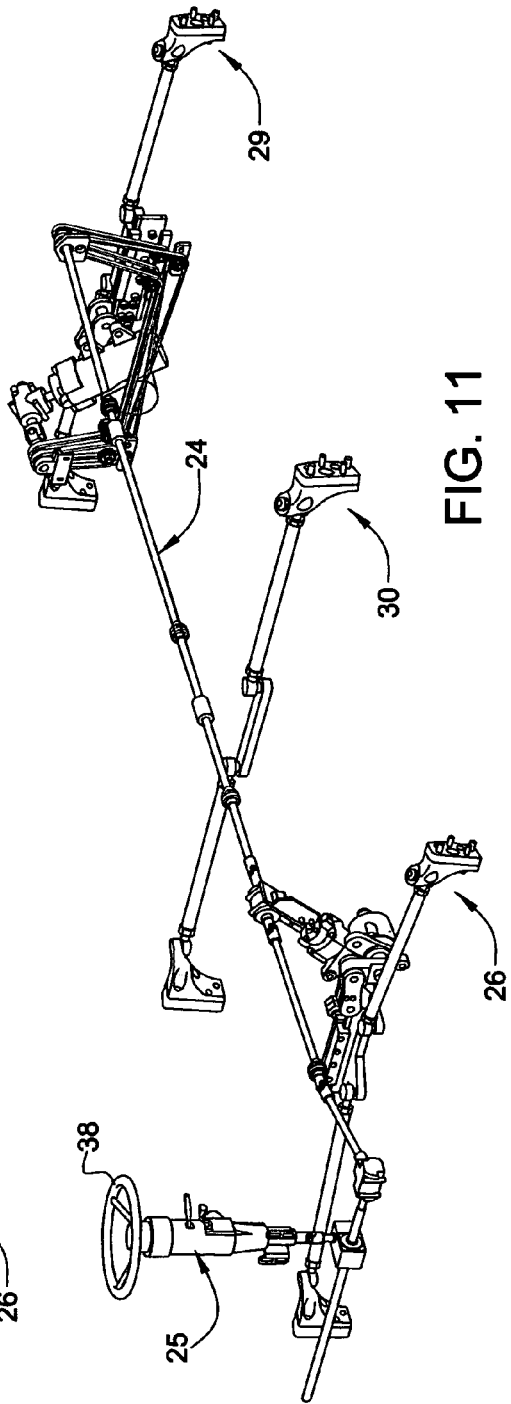

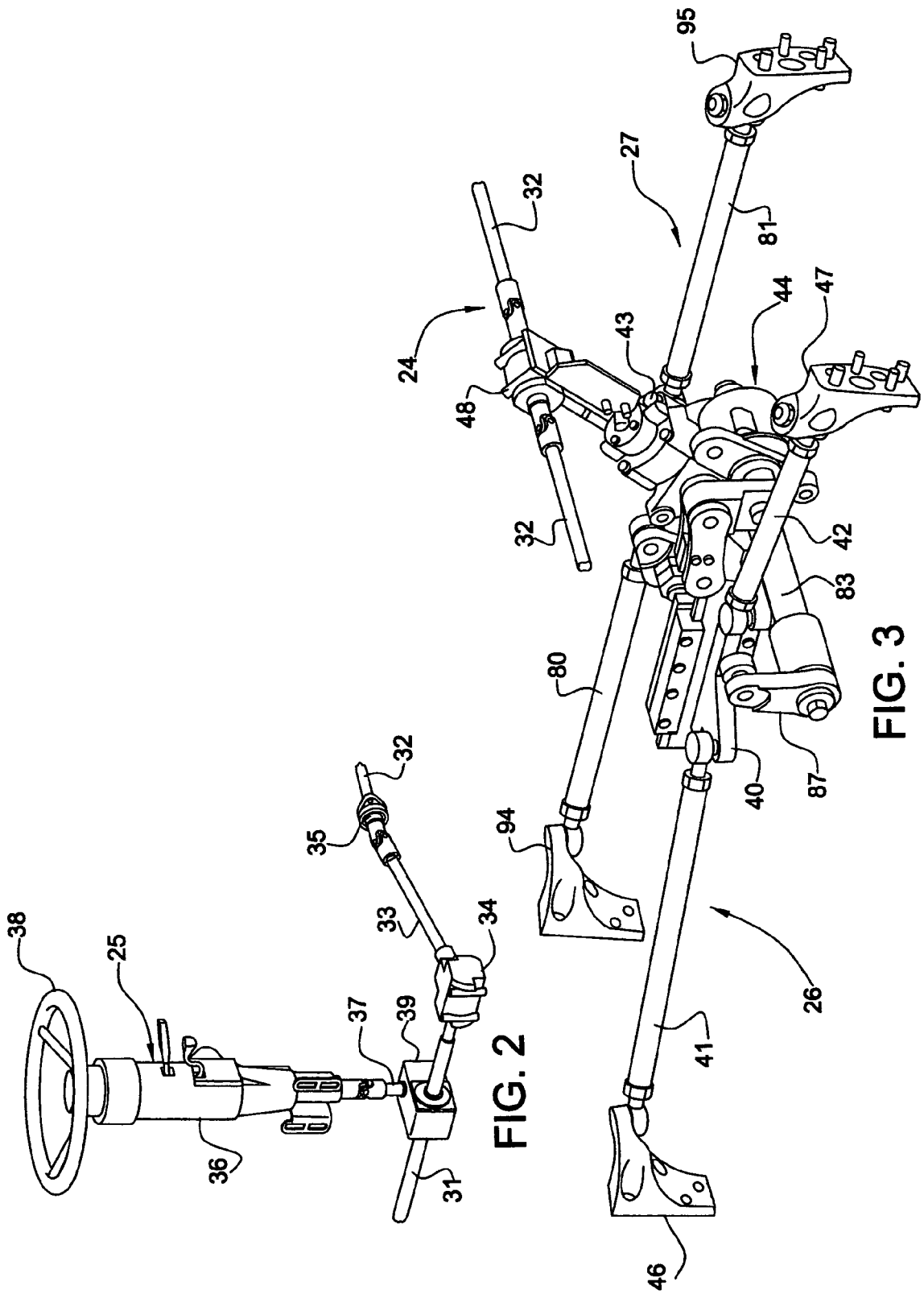

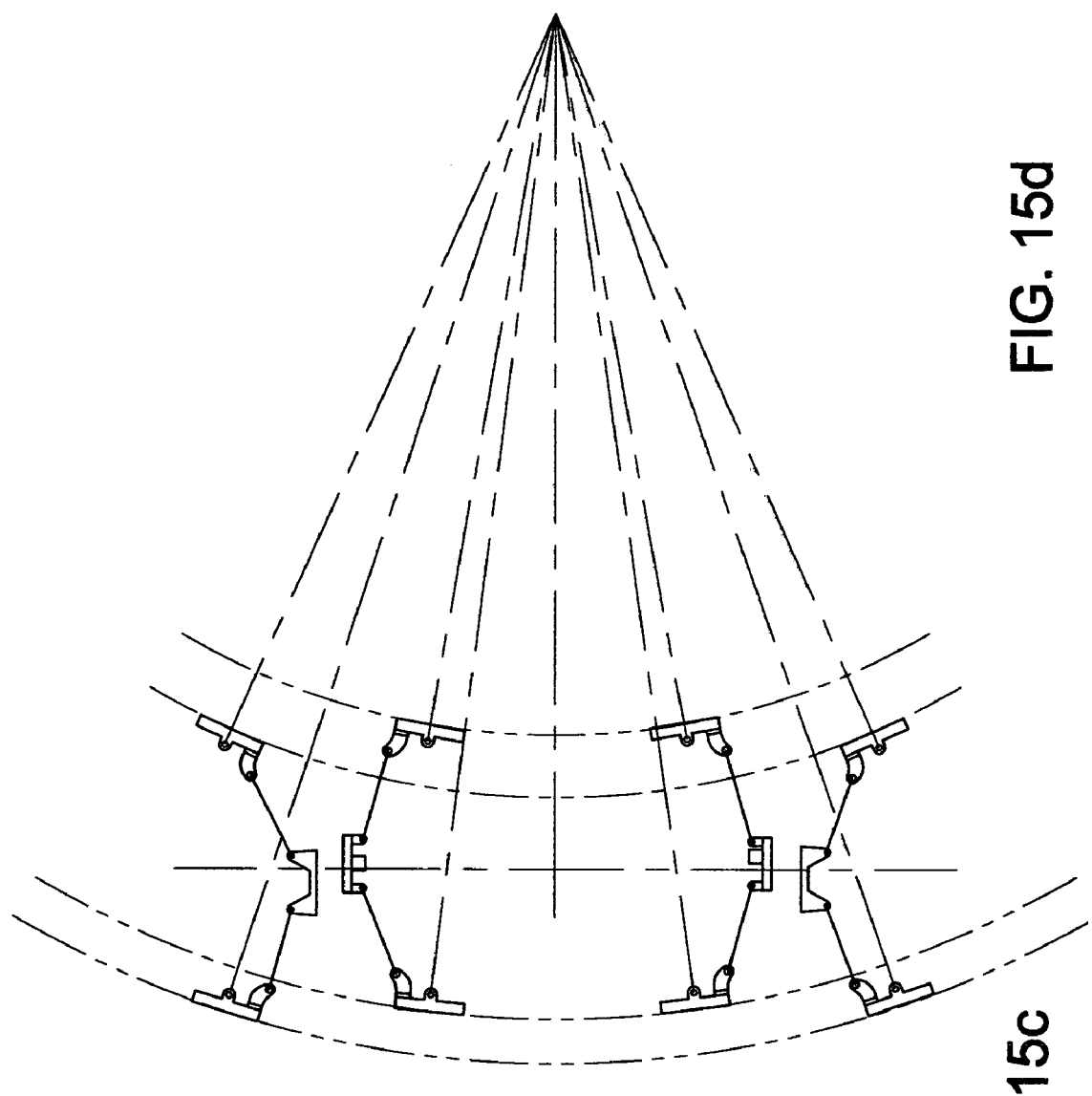
FIG. 15d
FIG. 15c
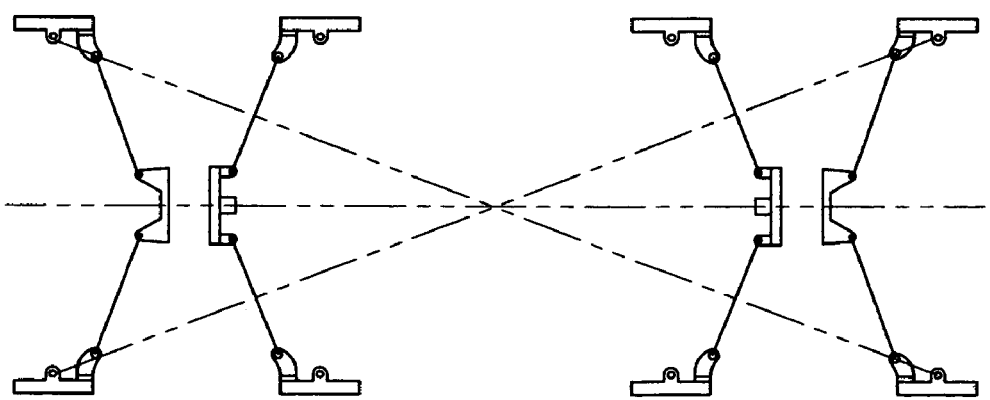

STEERING SYSTEM FOR AUTOMOTIVE VEHICLES

This invention relates to a steering system for automotive vehicles, and more particularly to a steering system adapted for use with vehicles having at least two steerable wheel units. This application is a continuation-in-part of PCT Application No. PCT/US03/31305 filed Oct. 3, 2003, which is incorporated herein by reference.

BACKGROUND OF THE INVENTION

In the automotive industry, there has been developed certain types of vehicles equipped with multiple steerable wheel units. Such vehicles have included vehicles with 4×4, 6×6, 8×8 and 10×10 wheel configurations. Typically, each of such vehicles has been equipped with a steering system peculiar to the particular wheel configuration of the vehicle. In this regard, it has been found to be desirable to provide a single steering system which can be easily modified to accommodate any of such vehicle configurations.

Accordingly, it is the principal object of the present invention to provide a novel steering system which can be modified to accommodate 4×4, 6×6, 8×8 and 10×10 wheel configurations. Further objects of the invention are to provide such a system in which the various modifications thereof provide a commonality of components, highly responsive steering wheel operation, left or right hand drive and concentric wheel tracks when the wheels are turned.

SUMMARY OF THE INVENTION

The aforementioned objects are achieved by providing a steering system for a vehicle having a body supported on at least two sets of steerable wheels, generally consisting of a steering shaft provided with a wheel supported on the vehicle body, a torque transmitting main shaft supported longitudinally on the vehicle body, means operatively interconnecting the steering shaft and the main shaft for transmitting rotary motion of the steering shaft to rotary motion of the main shaft, first transversely displaceable means operatively interconnecting knuckle brackets of one of the sets of steerable wheels, means operatively interconnecting the main shaft and the first transversely displaceable means for translating rotary motion of the main shaft to linear motion of the first transversely displaceable means, second transversely displaceable means operatively interconnecting knuckle brackets of the other set of steerable wheels, and means operatively interconnecting the main shaft and the second transversely displaceable means for translating rotary motion of the main shaft to linear motion of the second transversely displaceable means. With such two sets of wheels, a 4×4 vehicle configuration is provided. Such 4×4 vehicle configuration can be modified to a 6×6 configuration simply by adding a nonsteerable wheel unit between such steerable wheel units, modified to an 8×8 vehicle configuration by adding a slaved, steerable wheel to each of such two sets of steerable wheel units and modified to a 10×10 vehicle configuration by adding a slaved, steering wheel unit to each of such sets of steerable wheel units and adding a nonsteerable wheel unit between the slaved, steerable wheel units. In each of such configurations, the steerable wheel units are essentially of the same construction utilizing common components, and the nonsteerable wheel units are similar in construction and are provided with components common to all wheel units.

The steering shaft assembly of the system is adapted to be displaced transversely to provide left hand or right hand drive of the vehicle. The steering wheel along with the operator's seat is displaceable substantially vertically.

Precision steering response is provided by ball and socket connections of the various components of the system. Furthermore, concentric wheel tracks during turning of the vehicle is provided by arranging for the axes of the steerable wheels of the vehicle intersecting at a point on a line perpendicular to the longitudinal centerline of the vehicle at a midpoint of the vehicle.

The steering system described herein particularly is suitable for use in vehicles equipped with wheel suspension systems of the type described in PCT Patent Application No. PCT/US03/31228, entitled Wheel Unit for Automotive Vehicles, filed Oct. 3, 2003, which is incorporated herein by reference.

BRIEF DESCRIPTIONS OF THE DRAWINGS

FIG. 1 a perspective view of a steering system for a vehicle, embodying the present invention;

FIG. 2 is an enlarged, perspective view of the steering column of the system shown in FIG. 1;

FIG. 3 is an enlarged, perspective view of the first and second steering assemblies shown in FIG. 1, operable to steer the first and second sets of wheels of the vehicle;

FIG. 11 is a perspective view of a modification of the system shown in FIG. 1, suitable for use in a vehicle having a 6×6 wheel configuration;

FIG. 15c is a diagram of the steerable wheels of a vehicle embodying the present invention, comparable to the steering wheel arrangement shown in FIG. 15a, traveling in a straight ahead mode, providing a full Ackerman effect;

FIG. 15d is a diagram of the steerable wheels shown in FIG. 15c, traveling in a turning mode;

FIG. 21 is an enlarged, perspective view of the mechanism provided in the system shown in FIGS. 17 and 19 for translating rotary motion to linear motion for steering the wheels of the associated sets of wheels.

DETAILED DESCRIPTION OF THE EMBODIMENTS OF THE INVENTION

Figure 4:
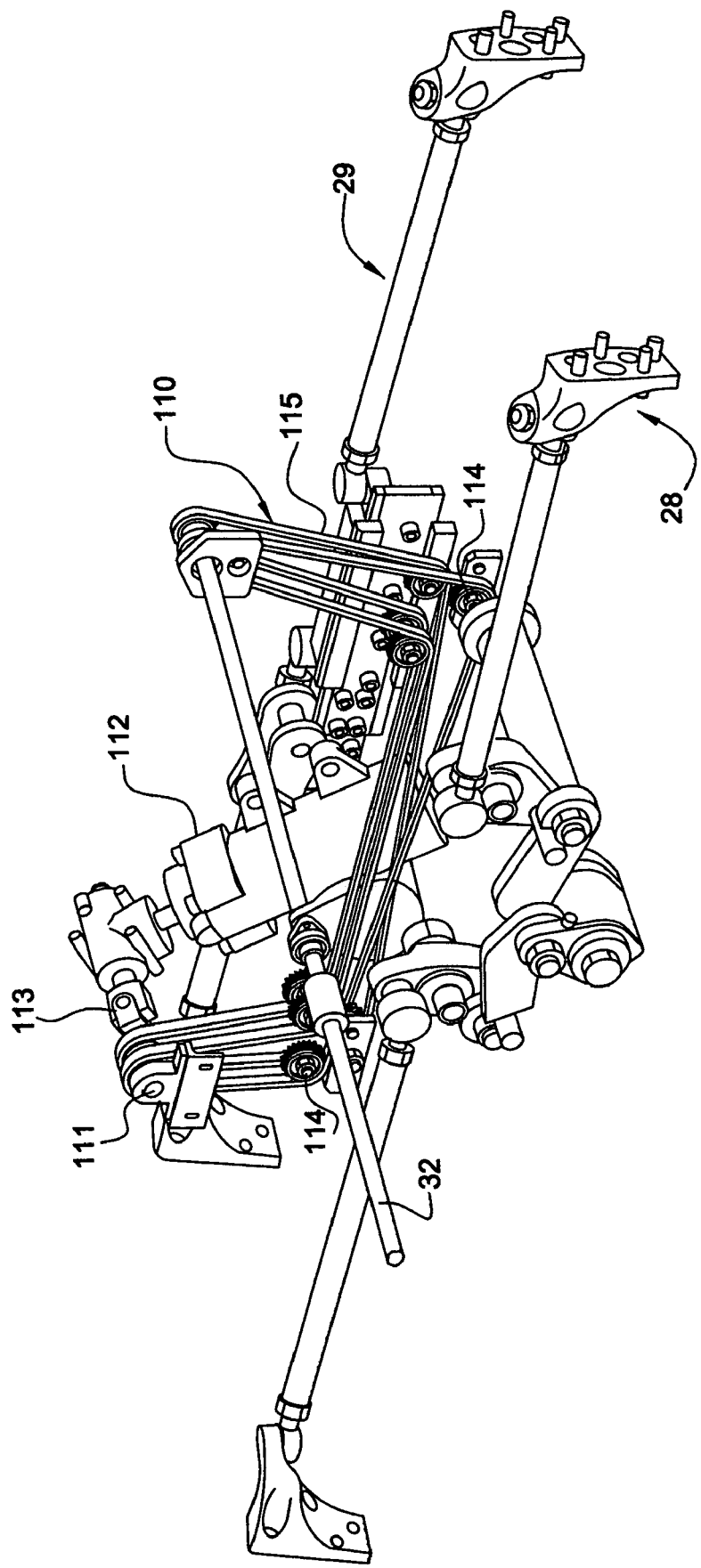
FIG. 4 is an enlarged, perspective view of the fourth and fifth steering assemblies shown in FIG. 1, operable to steer the fourth and fifth sets of wheels of the vehicle.
Figure 5:
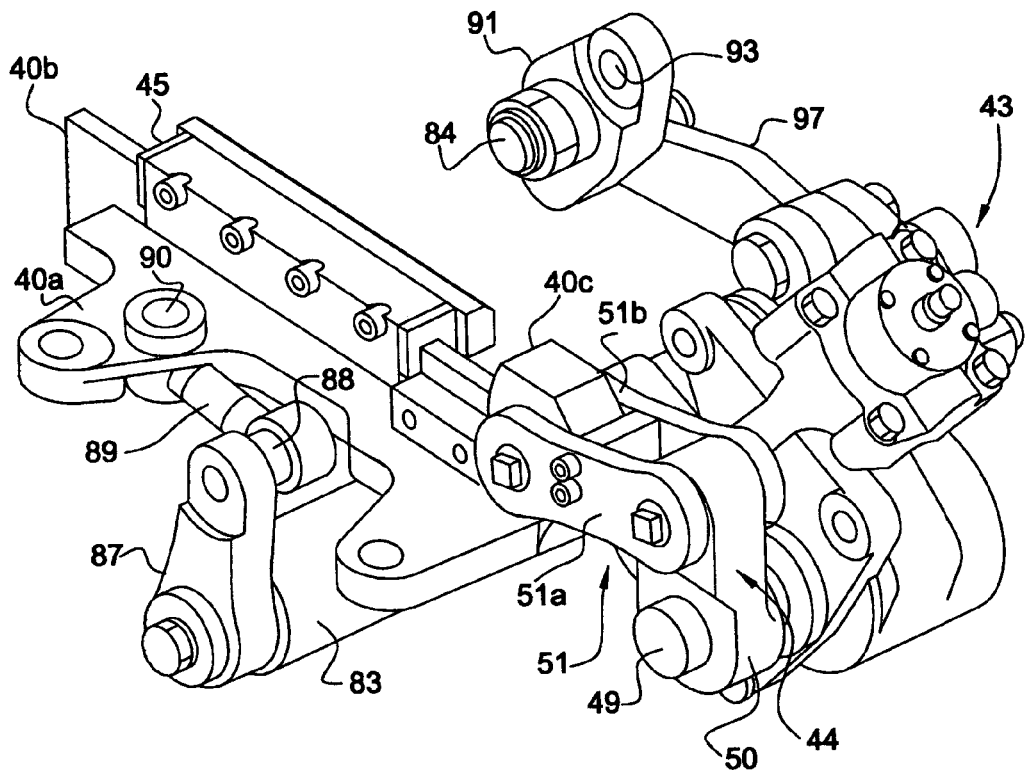
FIG. 5 is an enlarged, perspective view of the mechanism provided in the assemblies shown in FIGS. 3 and 4 for translating rotary motion to linear motion for steering the wheels of associated sets of wheels.
Figure 6:
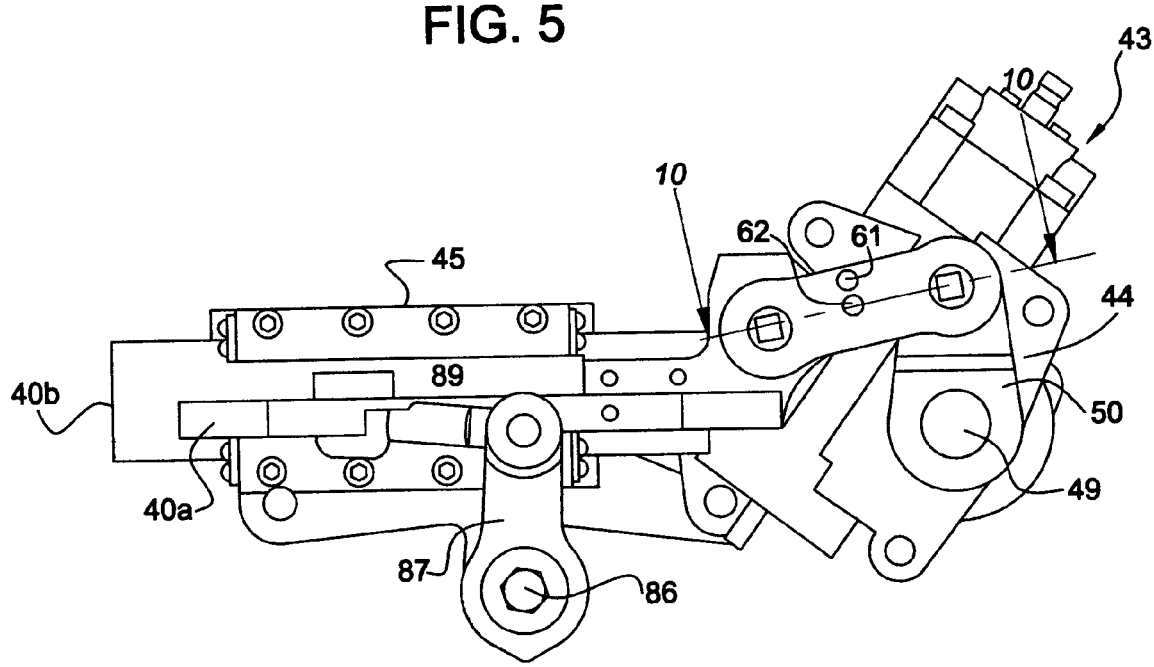
FIG. 6 is a front view of the mechanism shown in FIG. 5.

The present invention relates to an automotive vehicle generally consisting of a body mounted on a set of wheel units, a power plant mounted within the body, a drive train for transmitting drive from the power plant to the wheel units, and a steering system 23 mounted on the body and operatively connected to the steerable wheel units and various other auxiliary equipment and systems. Steering system 23 generally includes a motion transmitting assembly 24, a steering column assembly 25, wheel steering assemblies 26 through 29 and a nonsteerable assembly 30. Motion transmitting assembly 24 essentially functions to transmit rotary motion from steering column assembly 25 to steerable assemblies 26 through 29. Steering column assembly 25 is located at the operator's station on the vehicle and functions in the conventional manner to transmit rotary motion of the manually operated steering wheel to motion transmitting assembly 24 to turn the steerable assemblies. Wheel steerable assembly 26 interconnects a first set of wheels and is operatively connected to the motion transmitting assembly for translating the rotary motion of assembly 24 to linear motion of assembly 26. Steerable assembly 27 interconnects a second set of wheels of the vehicle and is slaved to assembly 26 for displacing transversely responsive to motion imparted by its master assembly 26. Steerable assembly 29 is similar to master assembly 26 but angularly displaced 180° relative to assembly 26, about a vertical axis. Such assembly interconnects a fifth set of wheels and similarly is operatively connected to assembly 24 for translating rotary motion of assembly 24 to transversely disposed linear motion of assembly 29. Steerable assembly 28 is similar to steering assembly 27 and is slaved to master assembly 29. It also is displaceable transversely by motion imparted by master assembly 29 and operatively interconnects a fourth set of wheels. Nonsteerable assembly 30 is disposed at the center of the vehicle and interconnects a set of nonsteerable wheels. Each of assemblies 26 through 30 is connected to a set of knuckle brackets of wheel units of the type as described and illustrated in aforementioned PCT Patent Application entitled Wheel Unit for Automotive Vehicles.

As best shown in FIG. 1, motion transmitting assembly 24 includes a transversely disposed shaft 31 located at the lower, front end of the vehicle adjacent the operator's station, a longitudinally disposed main shaft 32 and a short shaft 33 operatively interconnecting transversely disposed shaft 31 and longitudinally disposed shaft 32. Shaft 31 is rotatable about its axis and is connected at one end to a gear box 34 which functions to transmit the rotary motion of shaft 31 to rotary motion of shaft 33. Short shaft 33 is connected to main shaft 32 through a universal connection 35 which functions to transmit rotary motion of short shaft 33 to rotary motion of main shaft 32. Steering column assembly 25 generally includes a column 36, a steering shaft 37 journaled in column 36 and a conventional steering wheel 38 provided on the upper end of the steering shaft, accessible to the vehicle operator. Rotary motion of steering shaft 37 is transmitted to transversely disposed shaft 31 by means of a gear box 39. Shaft 37 has a slot and key type of connection with a gear of gear box 39 to permit the steering shaft assembly to be displaced along the axis of shaft 37, and transversely disposed shaft 31 similarly has a slot and key type of connection with a gear of gear box 39 so that the steering shaft assembly may be moved transversely along shaft 31.

As best shown in FIGS. 3 and 5 through 8, master steerable assembly 26 includes a transversely displaceable, connecting plate 40, a pair of tie rods 41 and 42, a steering gear unit 43 and a linkage 44 operative to translate rotary motion of the steering gear unit to linear motion of plate 40. Connecting plate 40 includes a horizontal plate portion 40a and a vertical plate portion 40b which is guided transversely by a housing 45 mounted on a transversely disposed plate portion of the vehicle body. Tie rod 41 operatively interconnects a protruding portion of plate 40 with a knuckle bracket 46 of a wheel unit by means of ball and socket connections. Similarly, tie rod 42 operatively interconnects a protruding portion of plate 40 with a knuckle bracket 47 of a wheel unit by means of a similar set of ball and socket connections. Steering gear unit 43 is of a conventional construction and functions in a conventional manner to enhance torque transmitted to steerable assembly 26. At an upper end thereof, it is operatively connected to main shaft 32 by means of a connection 48 and is provided at a lower end thereof with a longitudinally disposed output shaft 49.

Linkage 44 includes a Pittman arm 50 mounted on output shaft 49 and extending radially thereof and a link 51 consisting of a pair of spaced plates 51a and 51b pivotally connected at one set of ends to the free end of Pittman arm 50 and pivotally connected at an opposite set of ends to an upwardly projecting portion 40c of plate 40. To eliminate any lash in linkage 44 which would be detrimental to the responsiveness of the steering system, the connections of side plates 51a and 51b of link 50 with Pittman arm 50 and upwardly projecting portion 40c are provided with ball and socket connections as best shown in FIG. 10.

Figure 10:
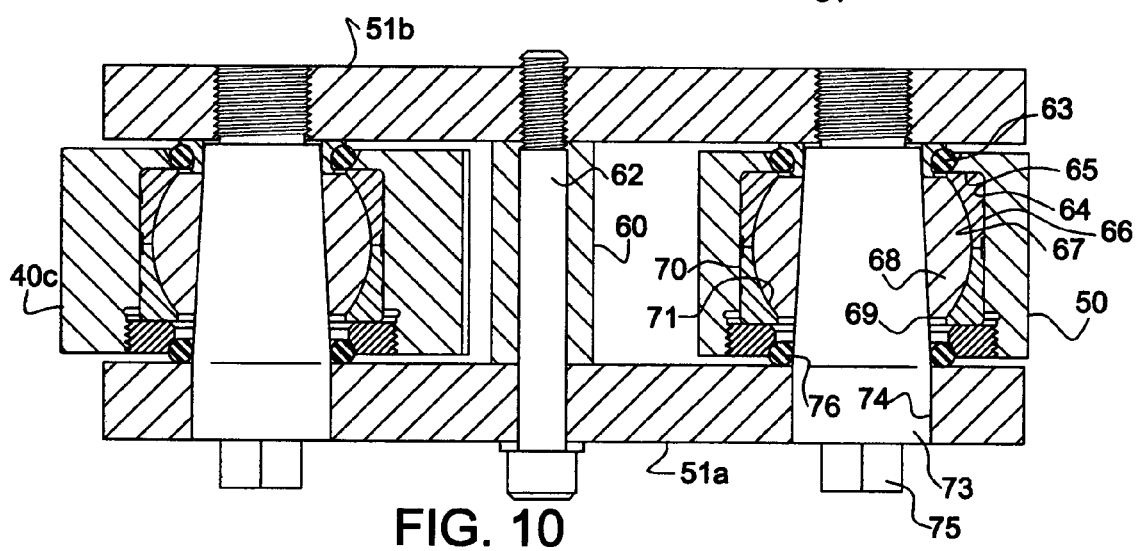
FIG. 10 is an enlarged, cross-sectional view taken along line 8-8 in FIG. 6.

Referring to FIG. 10, side plates 51a and 51b of link 51 are spaced apart by a spacer 60 and secured together by means of a set of bolts 61 and 62 extending through openings in side plate 51a and spacer 60 and threaded into threaded openings in side plate 51b. The free end of Pittman arm 50 is received between one set of ends of side plates 51a and 51b and is provided with an opening 63 therethrough having an enlarged section 64 providing an annular seating surface 65. Disposed in the enlarged section and seated on annular surface 65 is a first bearing seat element 66 having a spherical bearing surface 67. A spherical bearing 68 is seated on bearing surface 67, which is provided with a tapered opening 69 therethrough. A second bearing seat element 70 is disposed in enlarged section 64, having a spherical bearing surface 71 engaging bearing 68 and secured in position by a threaded nut 72 threaded into a threaded end portion of enlarged section 64. A tapered pin 73 is inserted through an opening 74 in side plate 51a registrable with tapered opening 69 in bearing 68, and is threaded into a threaded opening provided in side plate 51b. The head of pin 73 is formed with a nut portion 75 to permit a wrench to be applied thereon in inserting the pin in the registered openings to pivotally connect the Pittman arm to link 51. To preclude the entry of foreign matter between bearing surfaces, O-rings 76 and 78 are provided between the sides of the Pittman arm and the side plates of link 51.

The connection of the other end of side plates 51a and 51b to upwardly projecting portion 40c of plate 40 is similar to the connection of such plates to the Pittman arm. With such snug fits of the pivot pins with the spherical bearings, and the spherical interfaces of the bearings with their respective bearing seats, little if any lash will occur in translating the rotary motion of output shaft 49 of the steering gear unit to the linear motion of plate 40.

Figure 7:
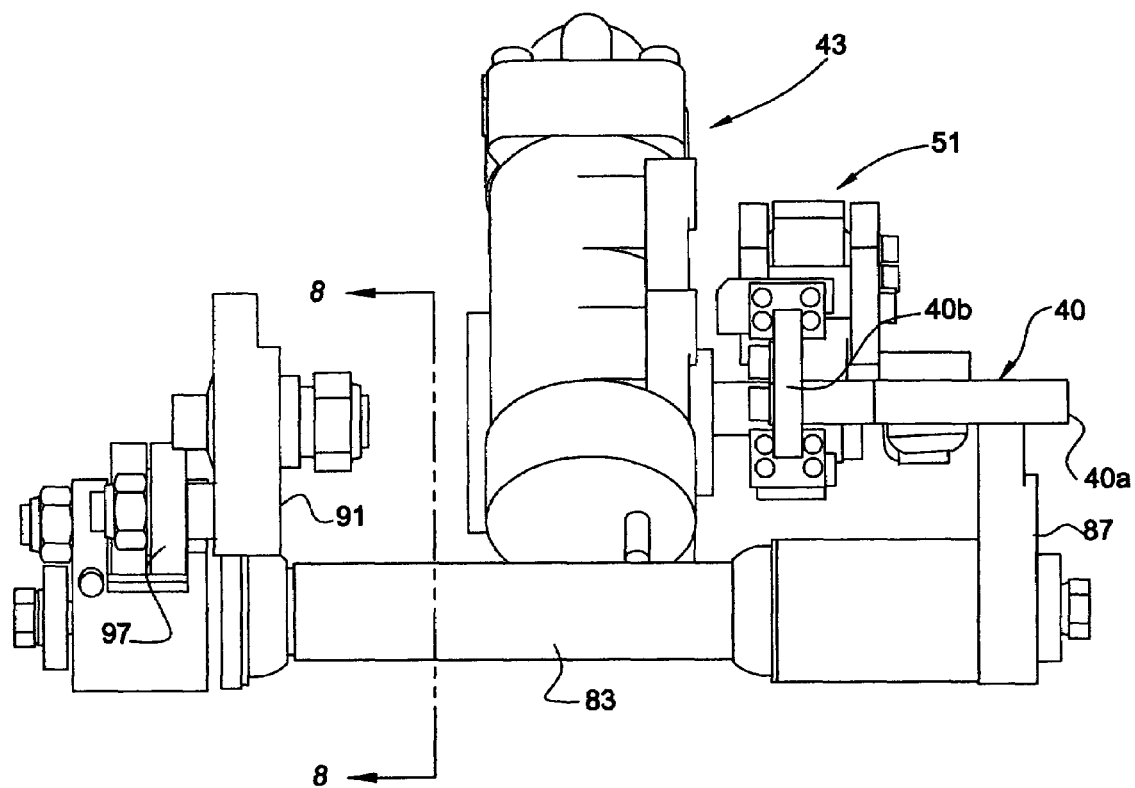
FIG. 7 is a side, elevational view of the mechanism shown in FIG. 6.
Figure 8:
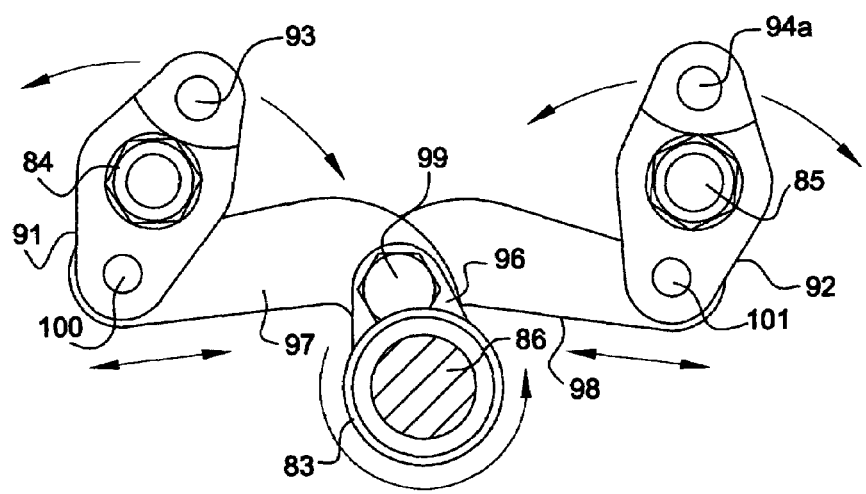
FIG. 8 is a cross-sectional view taken along 8-8 in FIG. 7.
Figure 9:
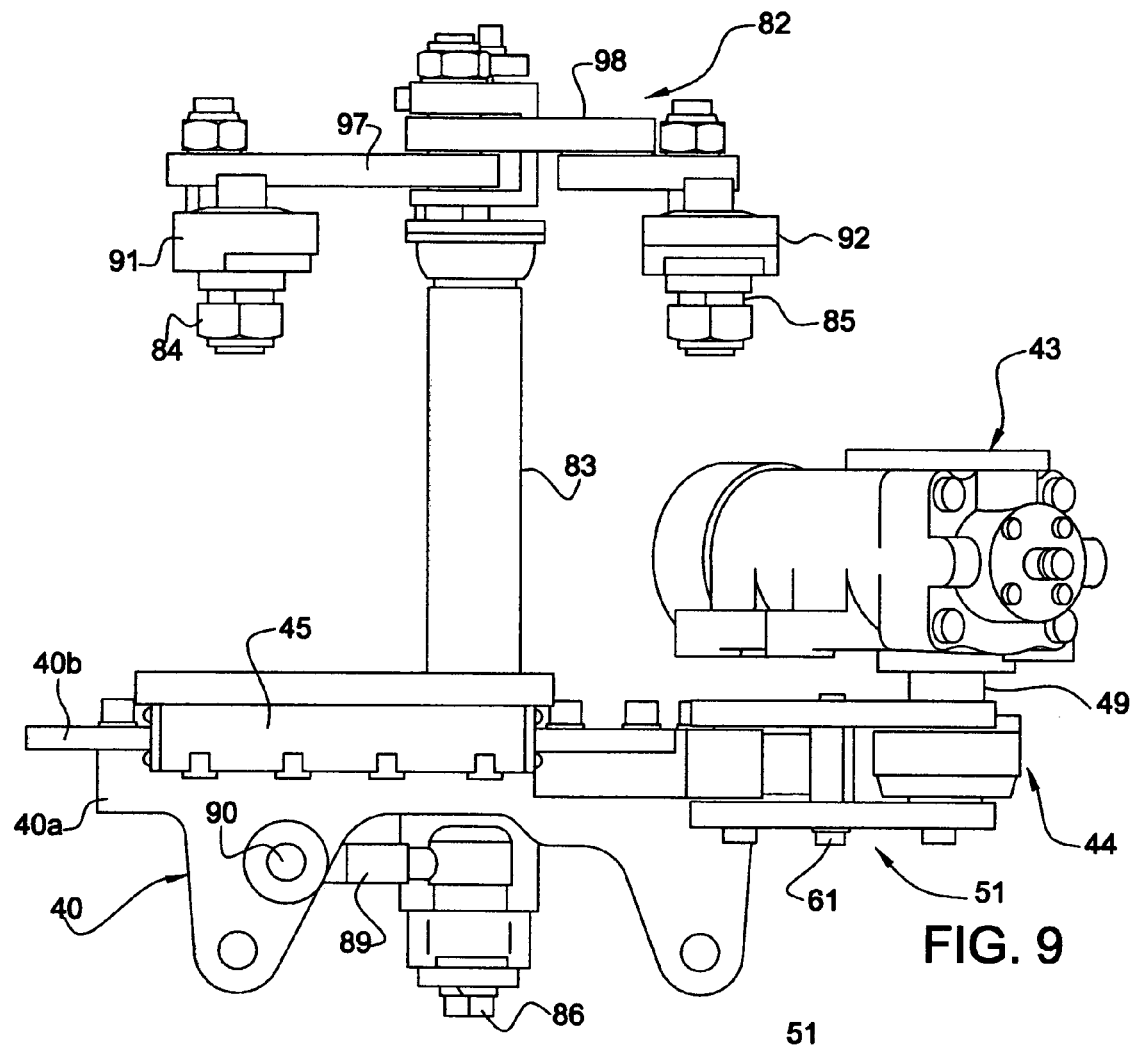
FIG. 9 is a top plan view of the mechanism shown in FIG. 5.

Slaved steerable assembly 27, as shown in FIG. 3, generally includes a pair of tie rods 80 and 81 comparable to tie rods 41 and 42 of master steerable assembly 26, and a motion translating mechanism 82, as best shown in FIGS. 7 through 9. The mechanism consists of a longitudinally disposed, tubular housing 83 supported on transversely disposed plate members of the vehicle body, and extending below master steerable assembly 26, and a set of longitudinally disposed, transversely spaced pins 84 and 85 also mounted on a transversely disposed plate member of the vehicle body. Mounted in tubular housing 83 is a transfer shaft 86 rotatable about its axis which is disposed parallel to the axes of pins 84 and 85. The forward end of shaft 86 is provided with a radially disposed arm member 87 which extends upwardly between the transversely spaced, forwardly protruding portions of plate 40. As best seen in FIG. 7, the upper end of arm member 87 is provided with a longitudinally disposed pin 88 which is pivotally connected to a link 89. The opposite end of link 89 is pivotally connected to a substantially vertical pin 90 on plate member 40 so that upon transverse linear displacement of plate member 40, such motion will be translated to pivotal motion of shaft 86 about its axis.

Pivotally mounted on pins 84 and 85 are a pair of crank arms 91 and 92. Tie rod 80 is pivotally connected at an inner end thereof to the upper end of arm member 91 by means of a connecting pin 93 and the outer end thereof is pivotally connected to a knuckle bracket 94 of a wheel of the second wheel assembly. Similarly, tie rod 81 is pivotally connected at an inner end thereof to the upper end of arm member 92 by means of a connecting pin 94a and is pivotally connected at an outer end thereof to a knuckle bracket 95 of a wheel of the second wheel assembly. The lower ends of arm members 91 and 92 are connected to a radially disposed portion 96 of shaft 86 by means of links 97 and 98 pivotally connected at their inner ends to radial disposed portion 96 by means of pivot pin 99 and pivotally connected at their outer ends to the lower ends of arm members 91 and 92 by means of connecting pins 100 and 101, respectively.

With the connection of slaved steerable assembly 27 to master steerable assembly 26 as described, it will be appreciated that the transverse, linear motion of plate member 40 of assembly 26 will be transmitted through mechanism 82 to tie rods 80 and 81 to cause the second wheel assembly to turn in unison with the first wheel assembly.

Master steerable assembly 29 is substantially similar in construction and operation to master steerable assembly 26 and is reoriented 180° about a vertical axis to provide for the associated wheels thereof to turn in a direction opposite the direction of the wheels associated with steerable assembly 26, and thus allow the vehicle to turn in the conventional manner. Steerable assembly 28 is slaved to master cylinder assembly 29 and also is reoriented 180° relative to and is similar in construction and operation to slaved steerable assembly 27. Because of the reorientation of steerable assemblies 28 and 29, drive from main drive transmitting shaft 32 must be transferred to the other side of the vehicle which is achieved through a chain drive assembly 110. Such assembly consists of a shaft 111 journaled in a bearing block mounted on a transverse plate member of the vehicle body, having a set of sprockets mounted thereon and being operatively connected to steering gear unit 112 of assembly 29 by means of a universal connection 113, a pair of sprockets mounted on the rear end of main shaft 32, a number of idler sprockets 114 rotatably mounted on shafts connected to transverse plate members of the vehicle body, and a set of chains 115 trained about the drive sprockets mounted on the end of shaft 32, driven sprockets mounted on shaft 111 and idler sprockets 114.

Nonsteerable assembly 30 consists merely of a connecting plate member 120 supported on the vehicle body, a pair of tie rods 121 and 122 connected at their inner ends to plate member 120 and connected at their outer ends to knuckle brackets 123 and 124 of the wheels of the third wheel assembly.

With the arrangement as shown in FIG. 1, whenever steering wheel 38 is turned, such rotary motion will be transmitted through assembly 25 to master steerable assemblies 26 and 29 and through such assemblies to slaved steerable assemblies 27 and 28 to cause the vehicle to turn either to the right or left.

The system shown in FIG. 1 may easily be modified to an 8×8 configuration by omitting nonsteerable assembly 30 and adjusting the wheel base, a 6×6 configuration by omitting slaved steerable assemblies 27 and 28, retaining non-steerable assembly 30a and adjusting the wheel base, as shown in FIG. 11, and a 4×4 configuration by eliminating slaved steerable assemblies 27 and 28 and nonsteerable assembly 30 and adjusting the wheel base. It further will be appreciated that such steerable and nonsteerable assemblies in all of such configurations utilize a maximum number of common components.

Figure 12:
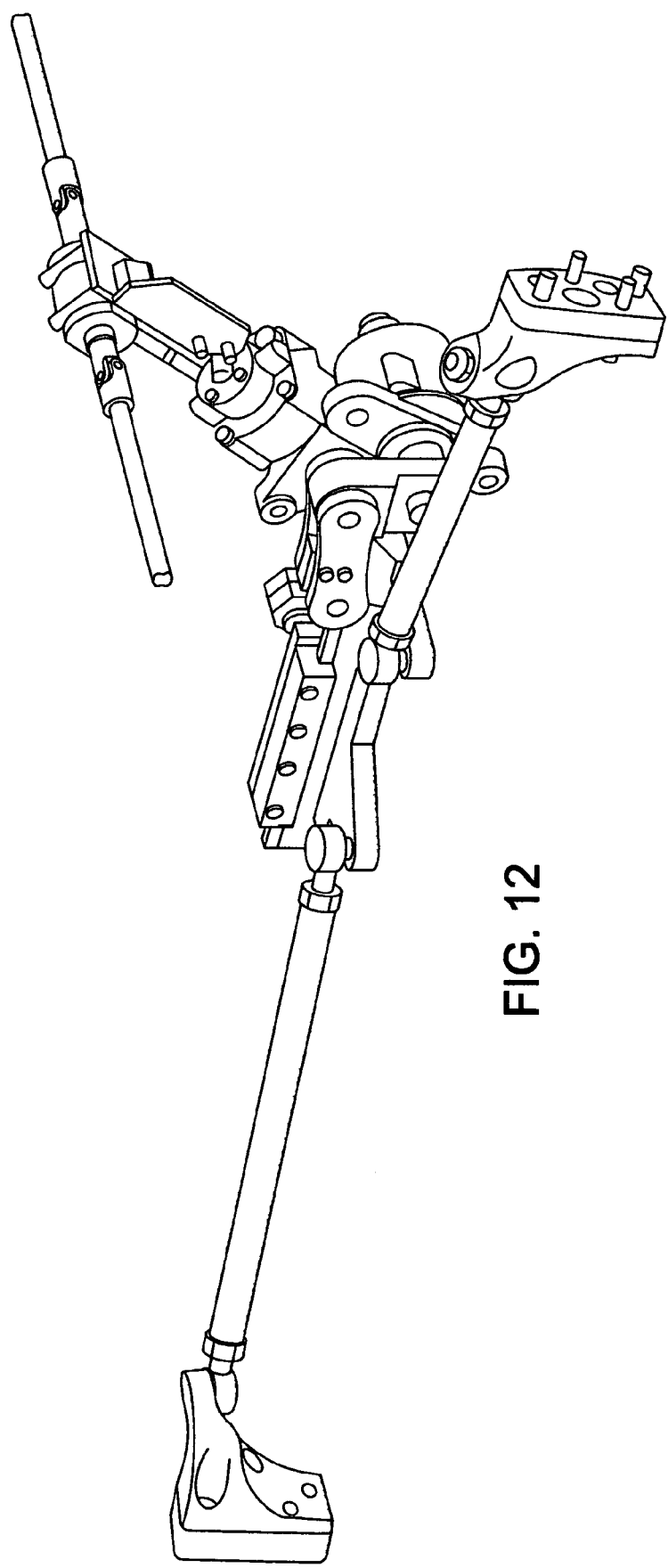
FIG. 12 is an enlarged, perspective view of the first steering assembly shown in FIG. 11, operable to steer a first set of wheels.
Figure 13:
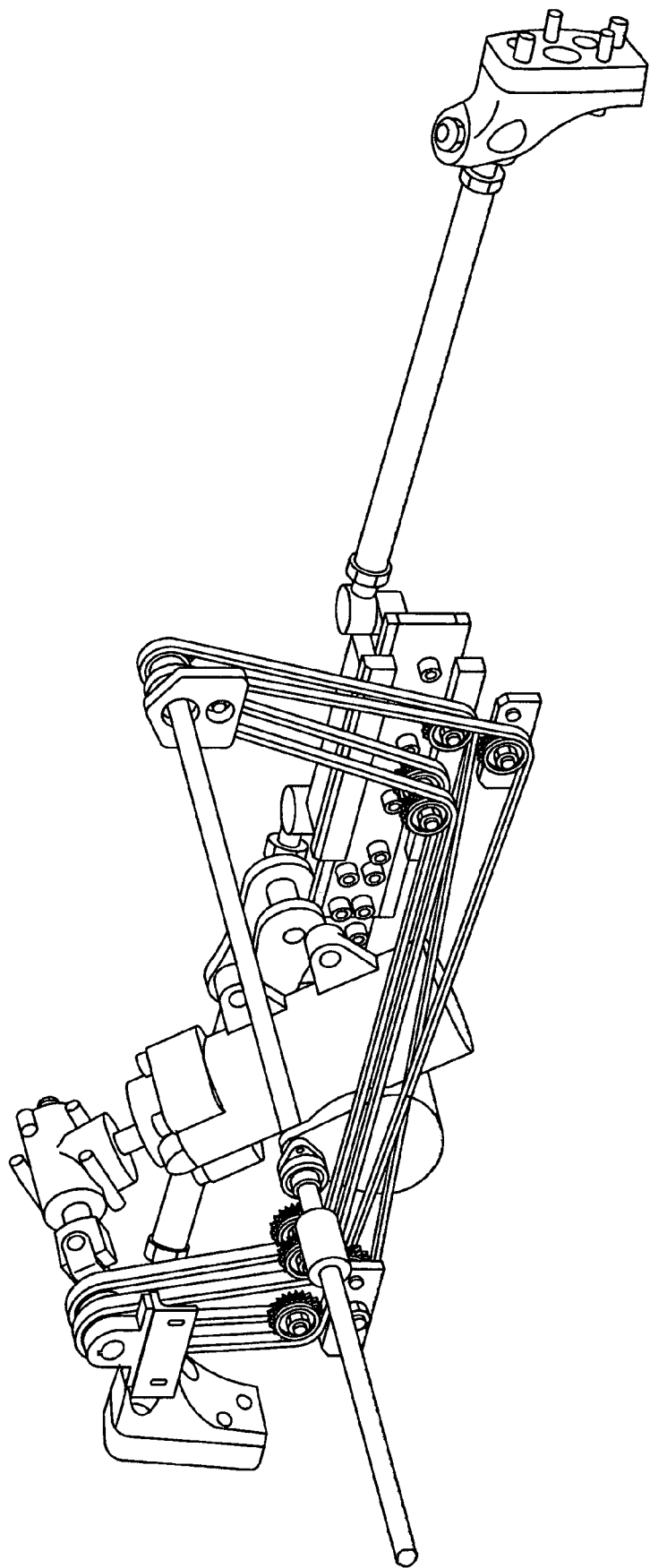
FIG. 13 is an enlarged, perspective view of the second steering assembly of the system shown in FIG. 11, operable to steer a third set of wheels.

FIG. 12 illustrates a steerable assembly without an operatively connected slaved steerable assembly, which may be used in 4×4 and 6×6 wheel configurations. Such assembly is essentially identical to steerable assembly 27 utilized in the 10×10 and 8×8 wheel configurations. FIG. 13 illustrates a steerable assembly without an operatively connected slaved steerable assembly which also is adapted for use in 4×4 and 6×6 wheel configurations. It is similar in construction and operation to master steerable assembly 29 described in connection with the steering arrangement for a 10×10 wheel configuration.

In order to prevent scrubbing of the wheels and difficult steering, all of the steerable wheels are provided with steering geometry to provide a full Ackerman effect. With such geometry, upon turning left or right, the extended axes of all of the steerable wheels will intersect at a common point on a line perpendicular to the longitudinal centerline of the vehicle at a center point thereof, and all of such wheels upon turning will travel along concentric tracks. Such common intersection of the axes of all steerable wheels can be achieved by a simple modification of the knuckle bracket arrangements of the forward most and rearward most steering assemblies, and an equally simple modification of the linkages of the slaved steering assemblies, as the wheel base of the vehicle varies.

In the master steering assemblies which would include the first and second assemblies of the 4×4 wheel configuration, the first and third assemblies of the 6×6 wheel configuration, the first and fourth assemblies of the 8×8 configuration and the first and fifth assemblies of the 10×10 configuration, the geometry for providing a full Ackerman effect is achieved by arranging for the axis of the pivotal connection of each tie rod to its respective knuckle bracket being disposed on a linear line passing through the steering axis of an associated wheel and the center point of the vehicle. Generally, this may be accomplished by displacing the axis of each of the knuckle bracket/tie rod pivotal connection transversely, and varying the distance between the axes of the pivotal connections between the tie rods and the interconnecting slidable plate a corresponding amount. The amount of displacement is a function of the wheel base of the vehicle or the distance of the wheels from the transverse centerline of the vehicle. The greater the wheel base of the vehicle, the lesser the displacement required. In the several embodiments described herein, the 4×4 configuration is likely to require the greatest displacement, and the 10×10 configuration is likely to require the least displacement, approaching a zero displacement.

Mechanically, a sufficient displacement of the knuckle bracket/tie rod pivotal axis to provide an Ackerman steering geometry may be achieved in the master steering assemblies of the several embodiments described herein by providing either differently configured knuckle brackets or a single knuckle bracket configuration and a number of spacers of different thicknesses, each of which would be positioned between the common knuckle bracket and its associated knuckle plate. Since a commonality of components of the various embodiments of the vehicles is desirable, it is preferred that the displacement adjustment required to provide an Ackerman steering geometry for each of the master steering assemblies, be accomplished by the use of a single knuckle bracket configuration and spacers of different thicknesses.

In each of the slaved steering assemblies which would include the second and third assemblies of the 8×8 wheel configuration and the second and fourth assemblies of the 10×10 wheel configuration, the Ackerman steering geometry is achieved by suitably configuring crank arms 91 and 92. In the assembly shown in FIG. 8, such adjustment is made by radially displacing the axis of connecting pin 93 relative to the axis of support pin 84, angularly displacing the axis of connecting pin 93 relative to a linear line passing through the axes of support pin 84 and connecting pin 100 and combinations of such displacements. A similar adjustment is made relative to crank arm 92. Essentially, for different wheel configurations, this would involve the selection of appropriate configurations of crank arms 91 and 92.

Figure 14B:
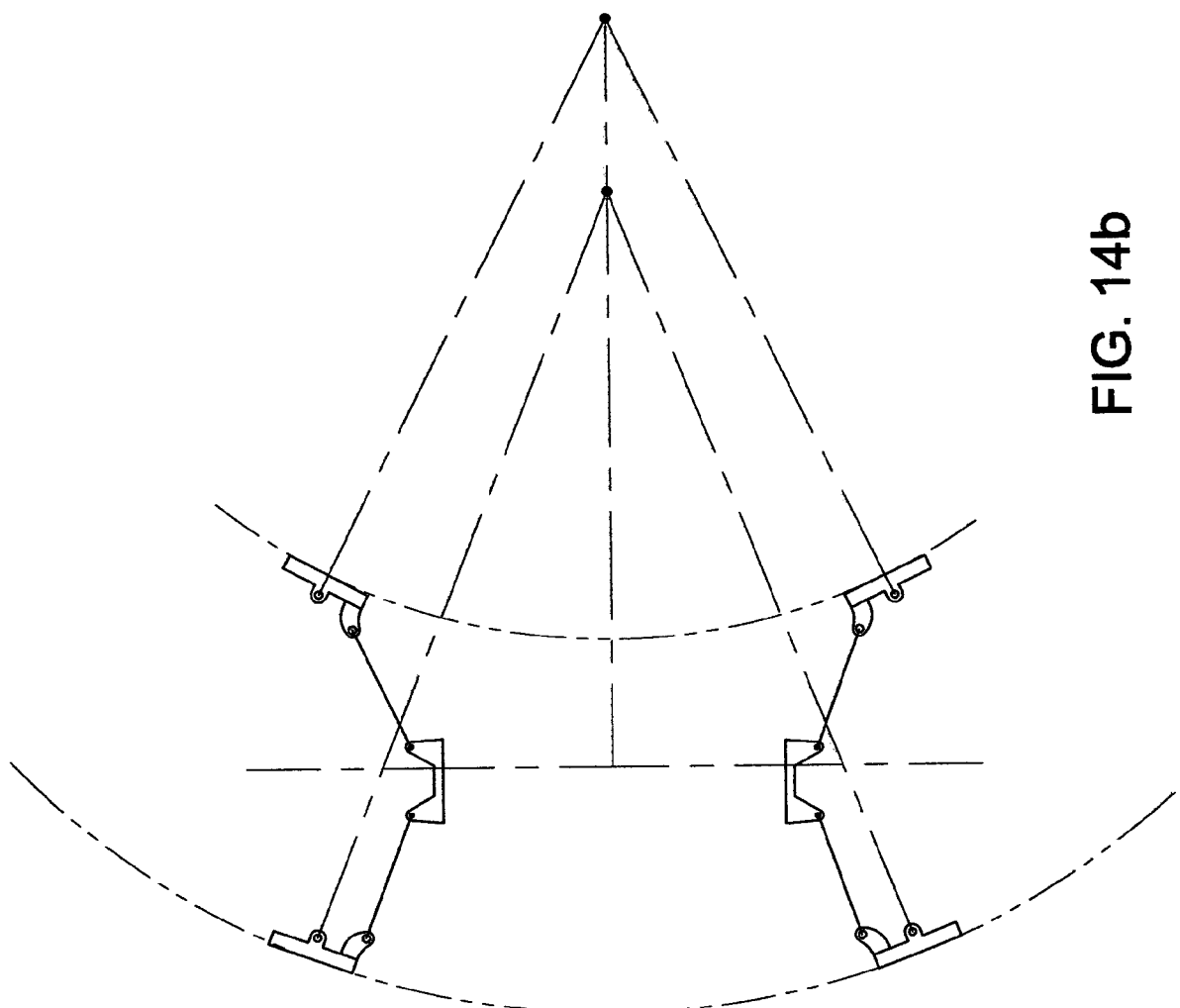
FIG. 14b is a diagram of the steerable wheels shown in FIG. 14a, traveling in a turning mode.
Figure 14A:
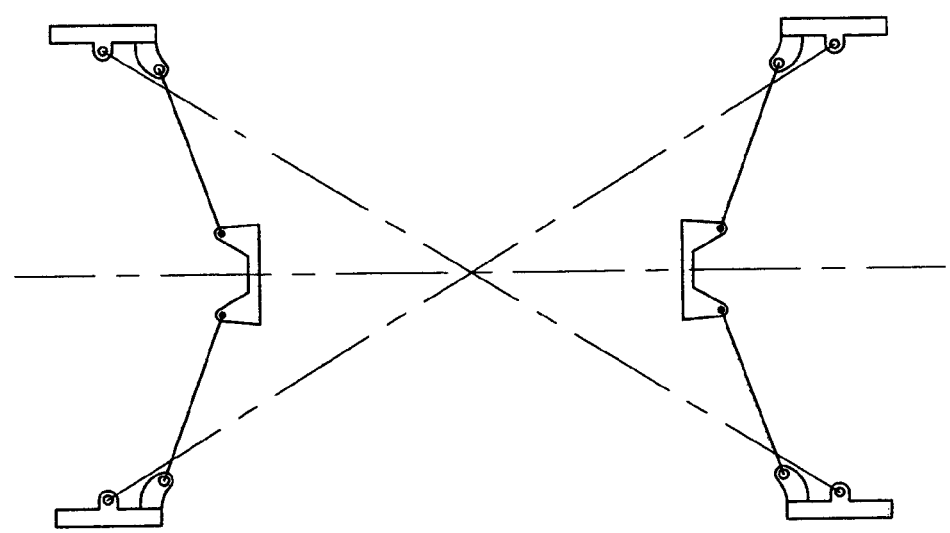
FIG. 14a is a diagram of the steerable wheels of a vehicle having a 4×4 wheel configuration, traveling in a straight ahead mode, not providing a full Ackerman effect.
Figure 14D:
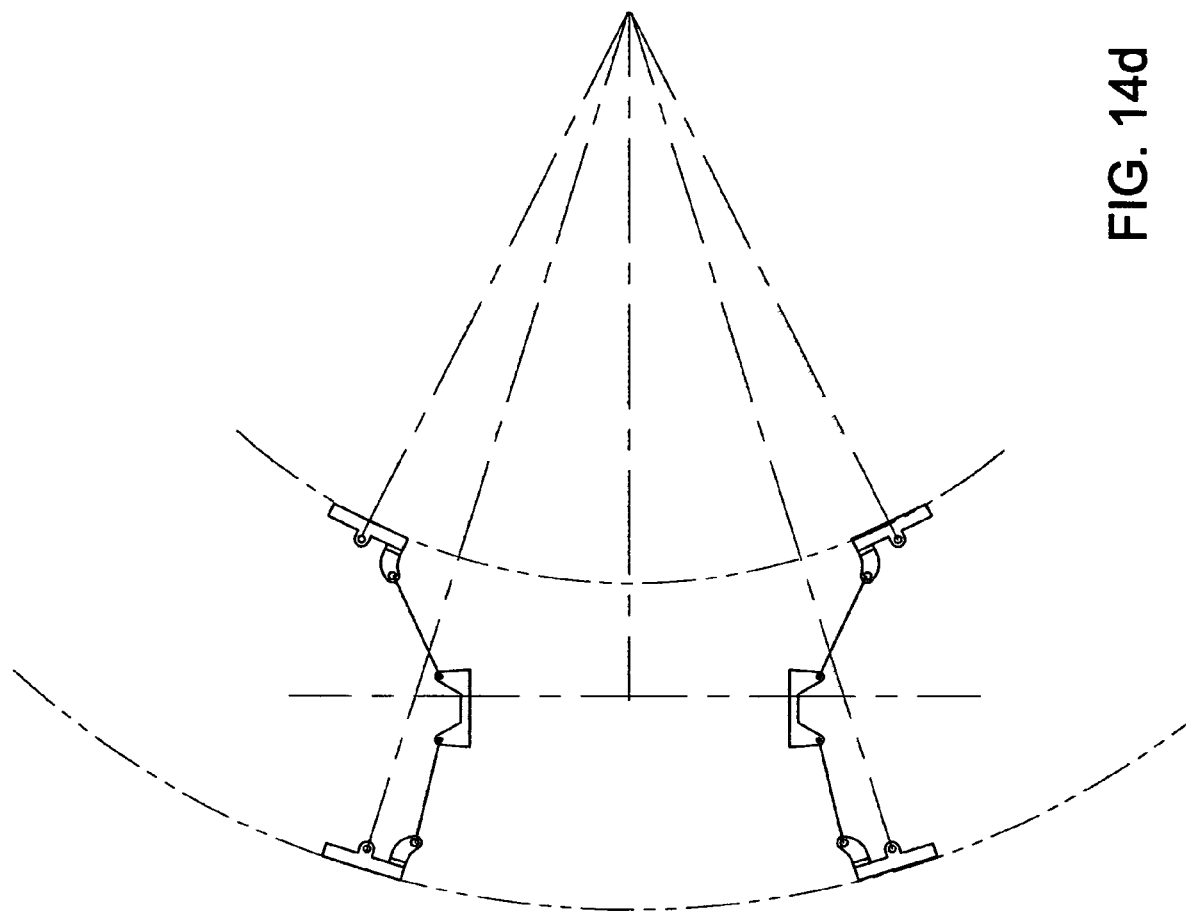
FIG. 14d is a diagram of the steerable wheels shown in FIG. 14c, traveling in a turning mode.
Figure 14C:
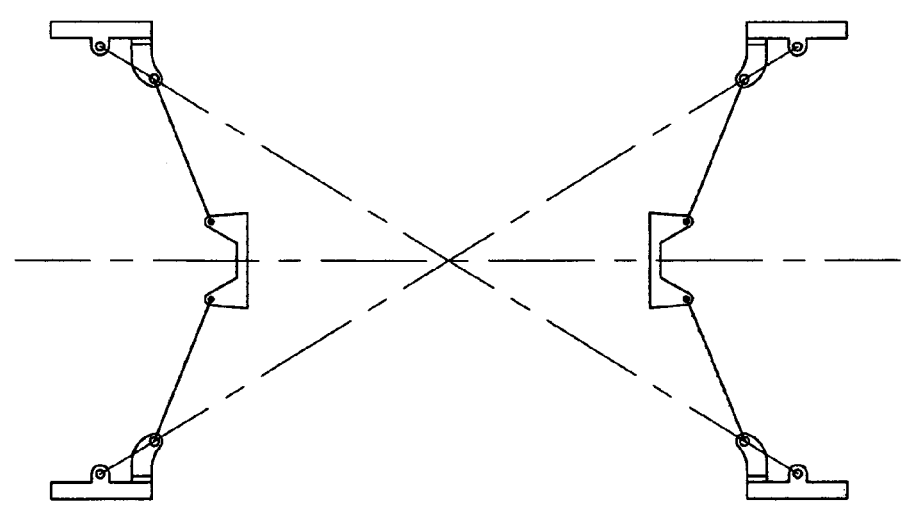
FIG. 14c is a diagram of the steerable wheels of a vehicle embodying the present invention, comparable to the steering wheel arrangement shown in FIG. 14a, traveling in a straight ahead mode, providing a full Ackerman effect.

FIGS. 14a through 16b illustrate diagrammatically the different wheel configurations each without a geometry providing a full Ackerman effect and with a geometry providing such effect, incorporating the modifications of the master and slaved steering assemblies as described. FIG. 14a illustrates a diagram of a 4×4 wheel configuration in which the axis of each pivotal connection of the knuckle bracket and its associated tie rod of each wheel fails to fall within a linear line intersecting the steering axis of such wheel and the center point of the vehicle. FIG. 14b illustrates the wheel configuration shown in FIG. 14a, in a turning mode. It will be noted that the extended axes of the inner wheels intersect at a common point spaced from the intersection of the extended axes of the outer wheels. FIGS. 14c and 14d illustrate the same 4×4 wheel configuration having the axis of each pivotal connection of a knuckle bracket and tie rod of each wheel intersecting a linear line from the steering axis of such wheel to the center point of the vehicle. FIG. 14d illustrates the 4×4 wheel configuration shown in FIG. 14c, in a turning mode, in which it will be noted that the axes of both the inner and outer wheels intersect at a common point on a line perpendicular to the centerline of the vehicle at a center point of the vehicle.

Figure 15B:
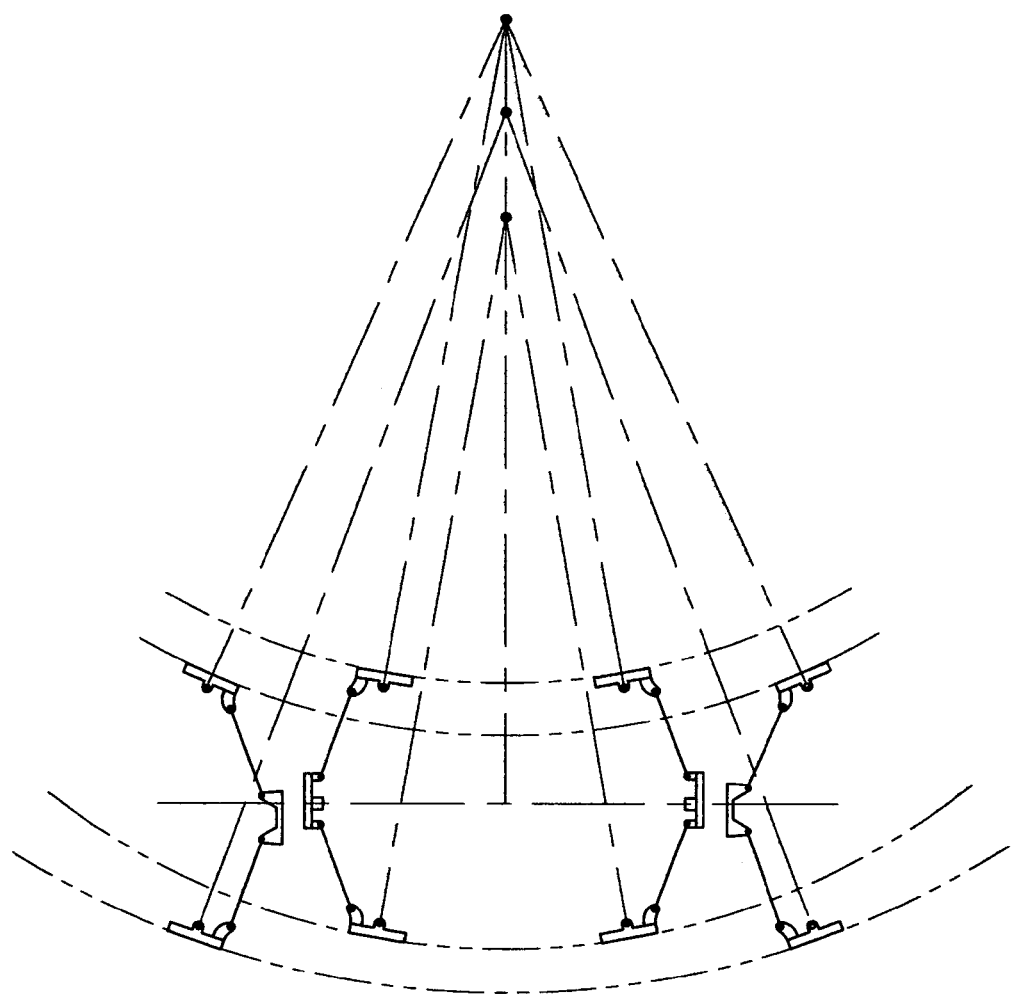
FIG. 15b is a diagram of the steerable wheels of the vehicle shown in FIG. 15a, traveling in a turning mode.
Figure 15A:
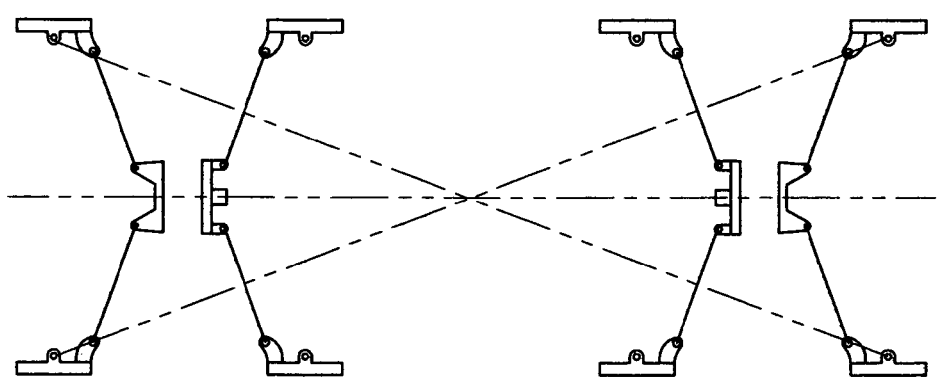
FIG. 15a is a diagram of the steering wheels of a vehicle having an 8×8 wheel configuration, traveling in a straight ahead mode, not providing a full Ackerman effect.

FIGS. 15a and 15b illustrate an 8×8 wheel configuration without a geometry providing a full Ackerman effect. As shown in FIG. 15b, the axes of the inboard and outboard wheels intersect at spaced points. FIGS. 15c and 15d illustrate the same configuration shown in FIGS. 15a and 15b but with each wheel having a geometry providing a full Ackerman effect, providing for all of the axes of the inner and outer wheels intersecting at a common turning axis.

Figure 16B:
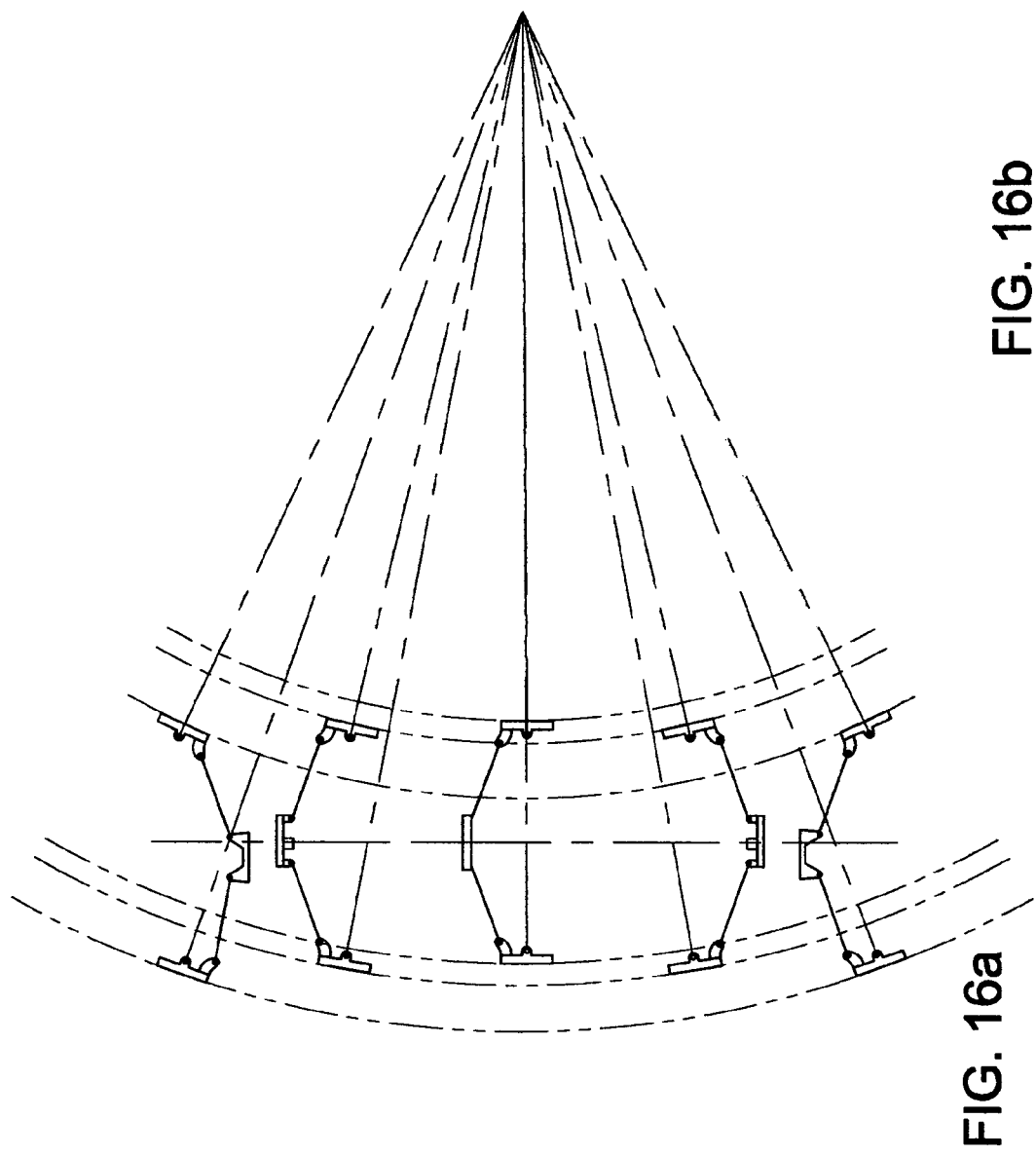
FIG. 16b is a diagram of the steerable and nonsteerable wheels shown in FIG. 16a traveling in a turning mode.
Figure 16A:
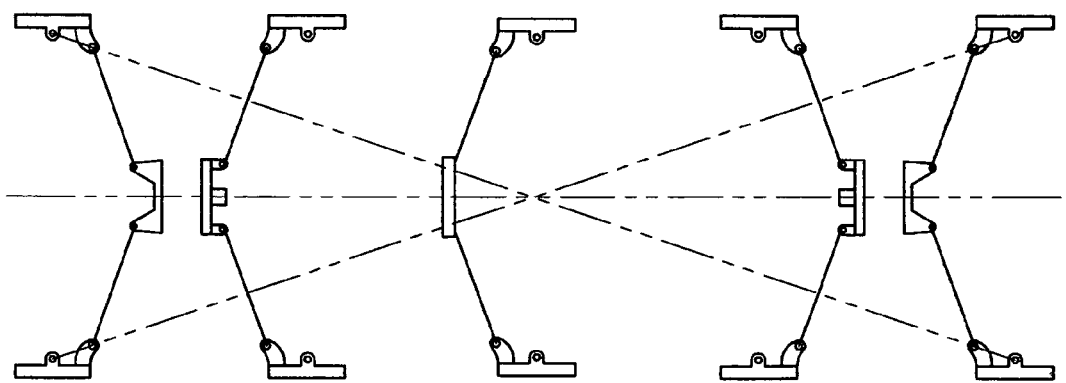
FIG. 16a is a diagram of the steerable and single nonsteerable wheels of a prior art vehicle having a 10×10 wheel configuration, traveling in a straight ahead mode.
Figure 17:
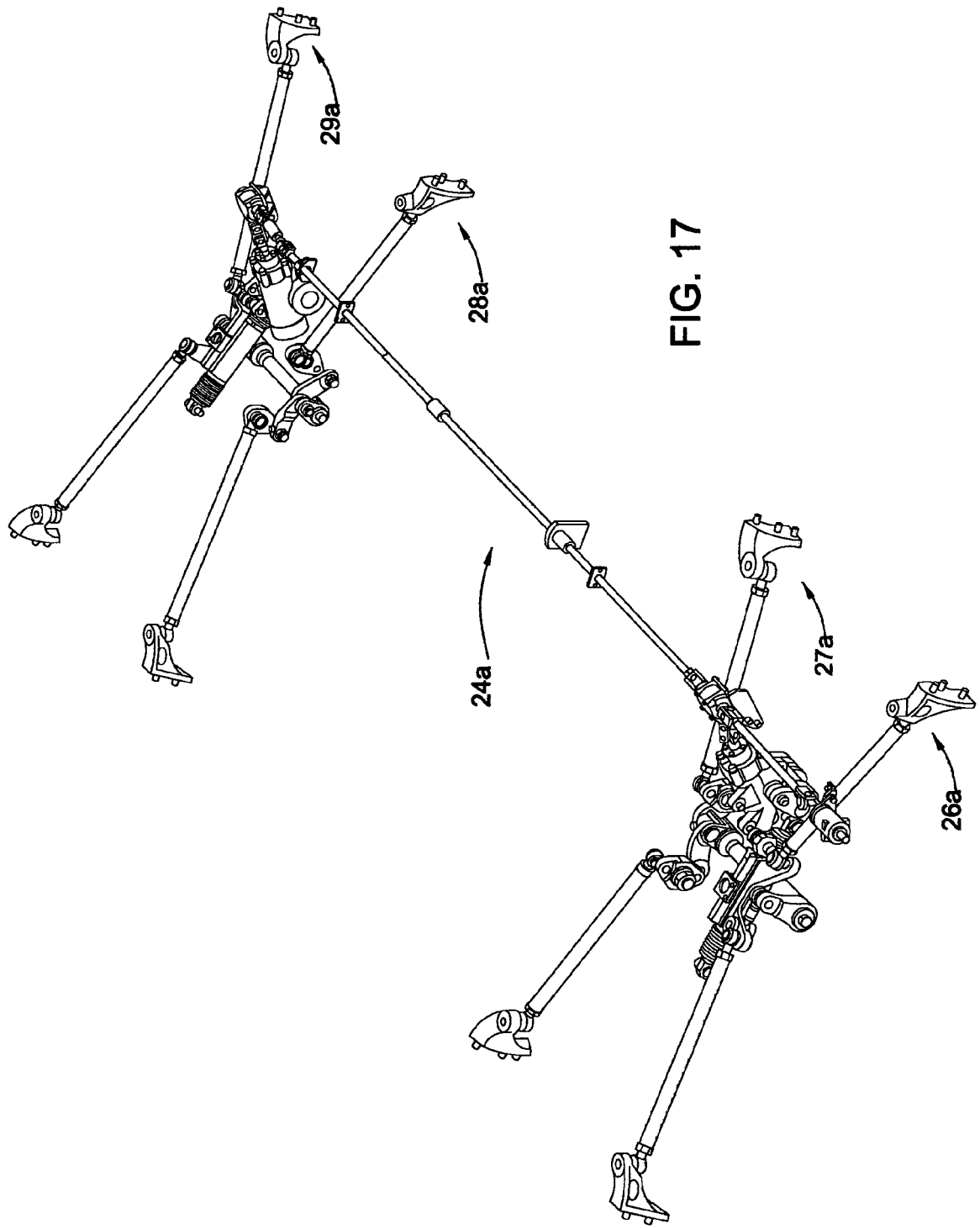
FIG. 17 is a perspective view of another steering system for a vehicle, embodying the present invention.

FIGS. 16a and 16b illustrate diagrammatically a 10×10 wheel configuration in straight ahead and turning modes. Because of the greater wheel base of such configuration, geometry providing a full Ackerman effect is achieved without any or near zero spacing adjustment of the master and slaved wheel assemblies.

FIGS. 17 through 21 illustrate a modification of steering system 23 less a nonsteerable assembly such as assembly 30 shown in FIG. 1, to provide a system accommodating a vehicle having an 8×8 wheel configuration. The modified system generally includes a motion transmitting assembly 24a comparable to previously described assembly 24, a steering column assembly (not shown) comparable to assembly 25, steering assemblies 26a, 27a and 28a comparable to assemblies 26 through 28, respectively, and a steering assembly 29a which is a modification of previously described steerable wheel assembly 29. As in the previously described embodiment, the steering column assembly functions in the conventional manner to transmit rotary motion of the manually operated steering wheel to motion transmitting assembly 24 to turn the steerable assemblies. Wheel steerable assembly 26a interconnects a first set of wheels and is operatively connected to the motion transmitting assembly for translating the rotary motion of assembly 24a to linear motion of assembly 26a. Steerable assembly 27a interconnects a second set of wheels of the vehicle and is slaved to assembly 26a for displacing transversely responsive to motion imparted by the master assembly 26a. Steerable assembly 29a is similar to but a mirror image of master assembly 26a. Assembly 26a interconnects a fourth set of wheels and similarly is operatively connected to assembly 24a for translating rotary motion of assembly 24a to transversely disposed linear motion of assembly 29a. Steerable assembly 28a is similar to steering assembly 27a and is slaved to master steering assembly 29a. It also is displaceable transversely by motion imparted by master assembly 29a and operatively connects a third set of wheels. Each of assemblies 26a through 29a is connected to a set of knuckle brackets of wheel units of the type described and illustrated in the aforementioned PCT Patent Application.

Motion transmitting assembly 24a and steering assemblies 26a through 28a are constructed and function similarly to motion transmitting assembly 24 and wheel steering assemblies 26 through 28, respectively. Steering assembly 29a functions similarly to steering assembly 29 of the previously described embodiment but is constructed similarly but differently, consisting of a mirror image of steering assembly 26a.

Figure 18:
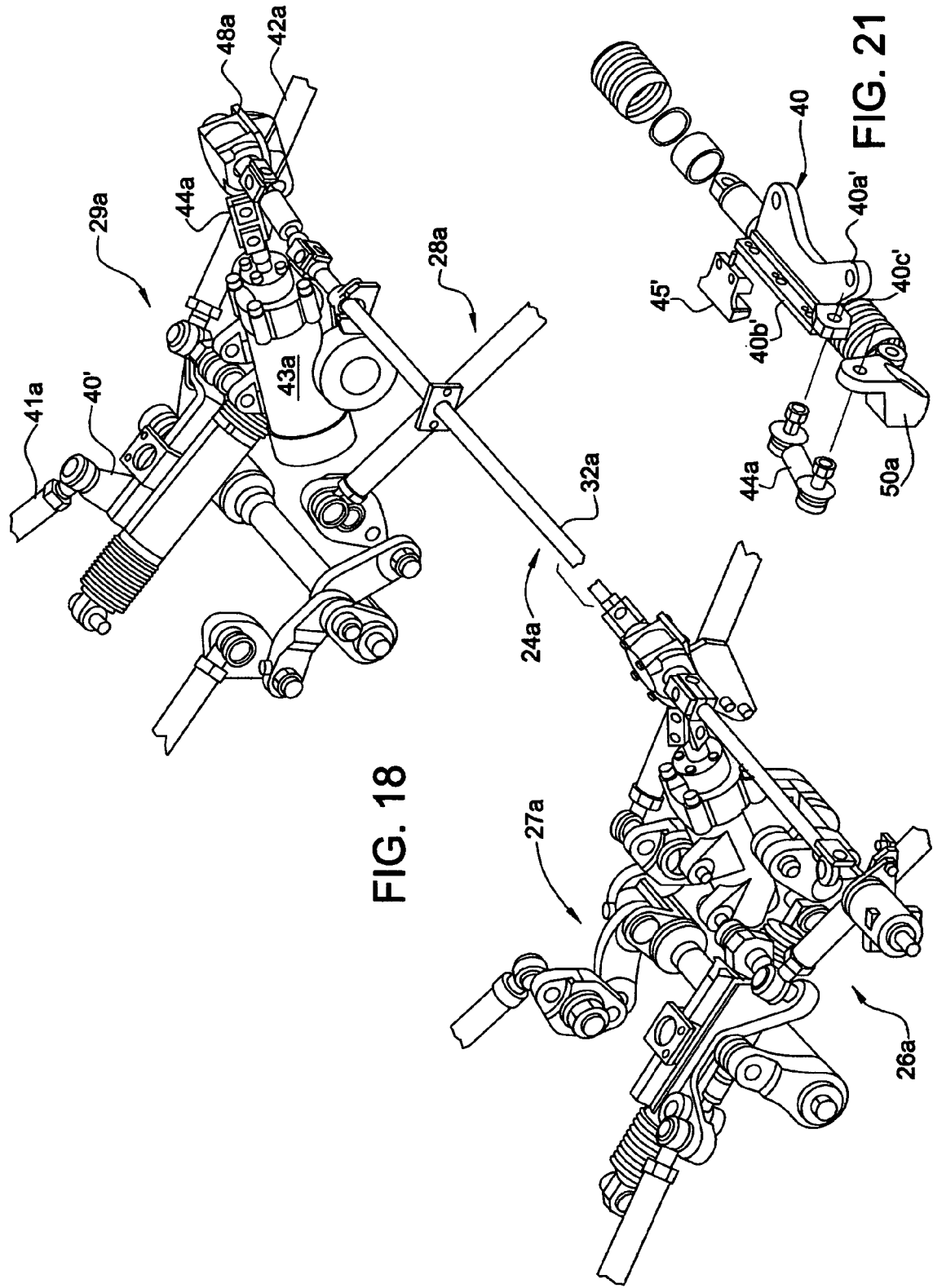
FIG. 18 is an enlarged, perspective view of the system shown in FIG. 17, having a portion thereof broken away.
Figure 19:
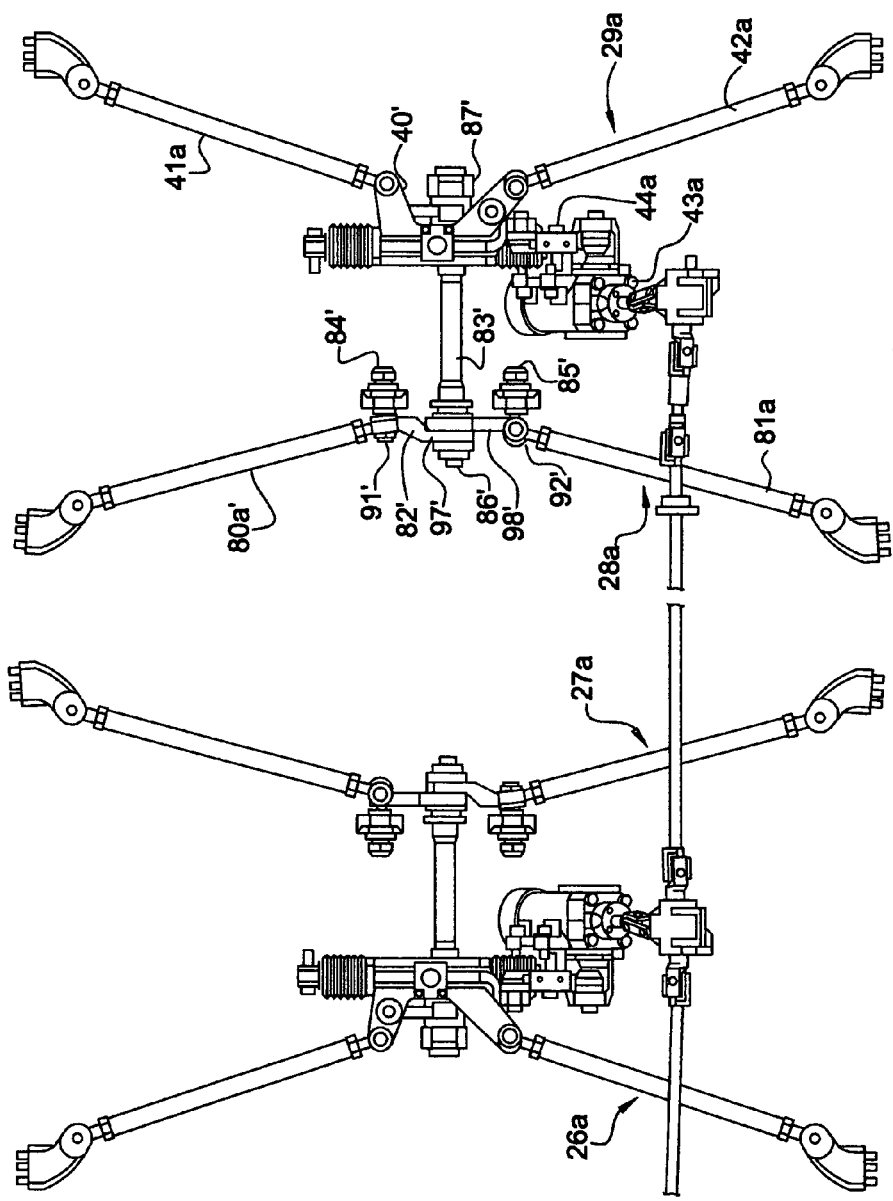
FIG. 19 is an enlarged, top plan view of the system shown in FIG. 17, having a portion thereof broken away.

As best seen in FIGS. 18, 19 and 21, master steering assembly 29a includes a transversely displaceable, connecting plate 40', a pair of tie rods 41a and 42a, a steering gear unit 43a and a linkage 44a operative to translate rotary motion from the steering gear unit to linear motion of plate 40'. Connecting plate 40' includes a horizontal plate portion 40a' and a vertical plate portion 40b' which is guided transversely by a guide bracket 45' mounted on a transversely disposed plate portion of the vehicle body. Tie rod 41a operatively interconnects a protruding portion of plate 40' with a knuckle bracket of a wheel unit by means of ball and socket connections. Similarly, tie rod 42a operatively interconnects a protruding portion of plate 40' with a knuckle bracket of a wheel unit by means of a similar set of ball and socket connections. Steering gear unit 43a is of a conventional construction and functions in a conventional manner to enhance torque transmitted to steerable assembly 29a. At an upper end thereof, it is operatively connected to main shaft 32a by means of a connection 48a and is provided at a lower end thereof with a longitudinal disposed output shaft.

Rotary motion of the output shaft of steering gear 43a is translated to linear motion of plate 40' by means of a Pittman arm mounted on the output shaft of the steering gear and extending radially thereof, and a link pivotally connected at one end to Pittman arm 50a and pivotally connected at an opposite end thereof to an upwardly projecting portion 40c' of plate 40'.

Slaved steerable assembly 28a, as best shown in FIGS. 18 and 19 generally includes a pair of tie rods 80a' and 81a' comparable to tie rods 80 and 81, respectively, and a motion transmitting mechanism 82'. The mechanism consists of a longitudinally disposed, tubular housing 83' supported on transversely disposed plate members of the vehicle body, and extending below master steerable assembly 29a, and a set of longitudinally disposed, transversely spaced pins 84' and 85' also mounted on a transversely disposed plate member of the vehicle body. Mounted in tubular housing 83' is a transfer shaft 86' rotatable about its axis which is disposed parallel to the axes of pins 84' and 85'. The rearward end of shaft 86' is provided with a radially disposed arm member 87' which extends upwardly between the spaced, rearwardly protruding portions of plate 40a'. The upper end of arm member 87' is provided with a longitudinally disposed pin which is pivotally connected to a link which in turn is pivotally connected to a substantially vertical pin on plate member 40a' so that upon transverse linear displacement of plate member 40a' such motion will be translated to pivotal motion to shaft 86' about its axis.

Pivotally mounted on pins 84' and 85' are a pair of crank arms 91' and 92'. Tie rod 80a' is pivotally connected at an inner end thereof to the upper end of arm member 91' by means of a connecting pin and the outer end thereof is pivotally connected to a knuckle bracket of a wheel of the third wheel assembly. Similarly, tie rod 81a' is pivotally connected at an inner end thereof to the upper end of arm member 92' by means of a connecting pin and is pivotally connected at an outer end thereof to a knuckle bracket of a wheel of the third wheel assembly. The lower ends of arm members 91' and 92' are connected to a radially disposed portion of shaft 86' by means of links 97' and 98' pivotally connected at their outer ends to the radially disposed portion of shaft 86' by means of a pivot pin and pivotally connected at their outer ends to the lower ends of arm members 91' and 92' by means of connecting pins.

With the connection of slaved steerable assembly 28a to master steerable assembly 29a as described, it will be appreciated that the transverse, linear motion of plate member 40a' of assembly 29a will be transmitted through mechanism 82' to the tie rods 80a' and 81a' to cause the third wheel assembly to turn in unison with the fourth wheel assembly.

Figure 20:
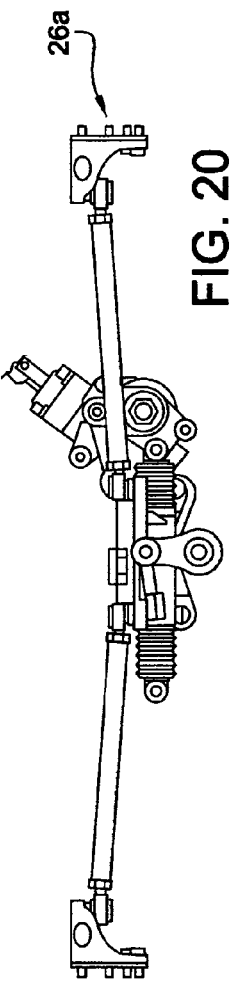
FIG. 20 is a front elevational view of the first assembly of the system shown in FIG. 19.

In the embodiment illustrated in the FIGS. 19 through 21, it will be appreciated that steering assemblies 26a, 27a and 28a are constructed essentially identical to and function similarly to steering assemblies 26, 27 and 28, respectively, and steering assembly 29a is constructed differently than but functions similarly to previously described steering assembly 29. It further will be appreciated that steering assembly 29a functions to operate slaved steering assembly 28a in the same manner that master steering assembly 29 functions to operate slave steering assembly 28. It further will be appreciated that master steering assembly 29a is similar to master steering assembly 26a except that steering gear 43a is the mirror image of the steering gear of assembly 26a.

The steering gear utilized for translating the rotary motion of the main shaft to transverse, linear displacement of the master steering assemblies may be of any conventional construction. It may consist of any commercially available rack and pinion, worm and roller or recirculating-ball type of steering gear. Preferably, it further would consist of a power steering or power-assisted steering system which is deemed to be required in view of the number and size of the steerable wheel assemblies.

In view of the foregoing, it will be appreciated that there is provided a novel steering system which is adapted to utilize different combinations of a master steerable assembly, a slaved steerable assembly and a nonsteerable assembly, having a large commonality of components, to accommodate vehicles having 4×4, 6×6, 8×8 and 10×10 wheel configurations, which may easily be converted to provide either right hand or left hand drive and which further is highly responsive to manual steering motions.

From the foregoing detailed description, it will be evident that there are a number of changes, adaptations and modifications of the present invention that come within the province of those having ordinary skill in the art to which the present invention pertains. However, it is intended that all such variations not departing from the spirit of the invention be considered as within the scope thereof as limited solely by the following claims.

We claim:
1. A steering system for a vehicle having a body supported on at least two sets of steerable wheels, comprising:
a steering shaft provided with a wheel, supported on said body;
a torque transmitting main shaft supported longitudinally on said body;
means operatively interconnecting said steering shaft and said main shaft for transmitting rotary motion of said steering shaft to rotary motion of said main shaft;
first transversely displaceable means directly operatively interconnecting knuckle brackets of one of said sets of steerable wheels;
a steering gear having a Pitman arm, directly operatively interconnecting said main shaft and said first transversely displaceable means for translating rotary motion of said main shaft to linear motion of said first transversely displaceable means;

second transversely displaceable means directly operatively interconnecting knuckle brackets of the other of said sets of steerable wheels; and a steering gear having a Pitman arm directly operatively interconnecting said main shaft and said second transversely displaceable means for translating rotary motion of said main shaft to linear motion of said second transversely displaceable means.

2. A steering system according to claim 1 wherein at least one of said steering gears is powered.

3. A steering system according to claim 1 wherein at least one of said steering gears is power-assisted.

4. A steering system according to claim 1 wherein each of said steering gears operatively interconnecting said main shaft and one of said transversely displaceable means for translating rotary motion of said main shaft to linear motion of said one of said transversely displaceable means includes a link pivotally connected to each of a Pittman arm and a transversely displaceable plate.

5. A steering system according to claim 4 wherein said link includes a pair of spaced plates having sets of opposed, registrable openings and each of said pivotal connections includes:

a portion of one of said Pittman arm and said slide plate received between said spaced plates, having an opening therethrough registrable with a set of openings in said side plates, and having an enlarged section providing an annular seat;

a first bearing seat disposed in said enlarged section, seated on said annular seat and having an opening therethrough registrable with said opening of said one of said Pittman arm and said plate, and a spherical seating surface;

a spherical bearing disposed in said enlarged section, seated on said seating surface of said first bearing seat and having a tapered opening therethrough registrable with said opening in said spherical bearing, and a spherical surface seated on said spherical bearing;

a second bearing seat disposed in said enlarged section, having an opening therethrough and a spherical surface seated on said bearing;

means provided on said one of said Pittman arm and said plate for retaining said bearing seats in said enlarged section and said bearing seated between said bearing seats; and a tapered pin extending through said one set of openings in said side plates and spherical bearing for pivotally connecting said one of said Pittman arm and said plate with said side plates.

6. A steering system according to claim 1 wherein each of said transversely displaceable means is pivotally connected at each of its ends to a knuckle bracket, and each of the pivotal connections of each of said transversely displaceable means and a knuckle bracket lies in a linear line passing through the turning axis of an associated wheel and a center point of said vehicle whereby the rotational axes of the wheels are caused to intersect at a point on a line perpendicular to the longitudinal centerline of the vehicle at the center point of the vehicle, and thus result in concentric wheel tracks when the wheels are turned.

7. A steering system according to claim 6 wherein each of said knuckle brackets includes a surface mountable on a knuckle plate of a wheel unit of the vehicle, and a pivotal connection spaced from said mounting surface, and each of said transversely displaceable means includes a transversely displaceable plate and a pair of tie rods each pivotally connected at one end thereof to said transversely displaceable plate and pivotally connected at the other end thereof to said pivotal connection of said knuckle bracket.

8. A steering system according to claim 7 including spacers disposed between said knuckle brackets and their respective knuckle plates, and wherein the spacing between the pivotal connections of said tie rods to said transversely displaceable plate is decreased an amount equivalent to the combined thicknesses of said spacers.

9. A steering system according to claim 8 wherein the thicknesses of said spacers decreases as the wheel base of the vehicles increases.

10. A steering system according to claim 1 wherein said second transversely displaceable means is spaced from and displaced 180° about a vertical axis, relative to said first transversely displaceable means.

11. A steering system according to claim 1 wherein each of said transversely displaceable means includes a transversely displaceable plate, a pair of tie rods each operatively interconnecting said plate and a knuckle bracket of a wheel, and each steering gear for translating rotary motion of said main shaft to linear motion of said transversely displaceable means includes an arm member pivotal about a longitudinally disposed axis and a link interconnecting said arm member and said plate for translating pivotal motion of said arm member to linear motion of said slide plate.

12. A steering system according to claim 1 wherein said first transversely displaceable means operatively interconnects a front set of wheels and said second transversely displaceable means operatively connects a rear set of wheels to provide a vehicle with a 4×4 configuration.

13. A steering system according to claim 12 including a non-steerable set of wheels mounted on said body between said front and rear sets of wheels to provide a vehicle with a 6×6 configuration.

14. A steering system according to claim 1 including a third transversely displaceable means operatively interconnecting knuckle brackets of a set of steerable wheels, slaved to said first transversely displaceable means, and a fourth transversely displaceable means operatively interconnecting knuckle brackets of a set of steerable wheels, slaved to said second transversely displaceable means to provide a vehicle with an 8×8 configuration.

15. A steering system according to claim 14 including means operatively interconnecting said first transversely displaceable means and the slaved means thereof for transmitting linear motion of said first transversely displaceable means to the slaved means thereof, and means operatively interconnecting said second transversely displaceable means and the slaved means thereof for transmitting linear motion of said second transversely displaceable means to the slaved means thereof.

16. A steering system according to claim 14 wherein said first transversely displaceable means operatively interconnects a front set of wheels, said second transversely displaceable means operatively interconnects a rear set of wheels, said means slaved to said first transversely displaceable means operatively interconnects a third set of wheels and said means slaved to said second transversely displaceable means operatively interconnects a fourth set of wheels to provide a vehicle with an 8×8 configuration.

17. A steering system according to claim 16 wherein each of the forwardmost and rearwardmost of said transversely displaceable means is pivotally connected at each of its ends to a knuckle bracket, and each of the pivotal connections of each of said forwardmost and rearwardmost transversely displaceable means and a knuckle bracket lies in a linear line passing through the steering axis of a wheel and a center point of said vehicle whereby upon turning said wheels the rotational axes of the wheels are caused to intersect at a point on a line perpendicular to the longitudinal centerline of the vehicle at the center point of the vehicle.

18. A steering system according to claim 16 including a nonsteerable set of wheels mounted on said body between said sets of wheels of said slaved means to provide a vehicle with a 10×10 configuration.

19. A steering system according to claim 18 wherein each of the forwardmost and rearwardmost of said transversely displaceable means is pivotally connected at each of its ends to a knuckle bracket, and each of the pivotal connections of each of said forwardmost and rearwardmost transversely displaceable means and a knuckle bracket lies in a line passing through the steering axis of a wheel and a center point of said vehicle whereby upon turning of said wheel the rotational axes of the wheels are caused to intersect at a point on a line perpendicular to the longitudinal centerline of the vehicle at the center point of the vehicle.

* * * * *